July 19, 1966  H. S. HEMSTREET  3,261,912
SIMULATED VIEWPOINT DISPLACEMENT APPARATUS
Original Filed April 11, 1955  7 Sheets-Sheet 2
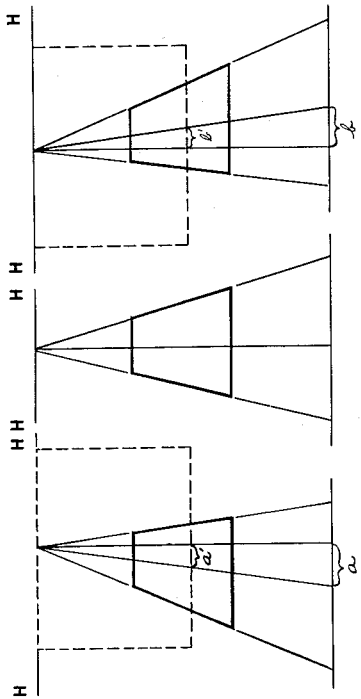
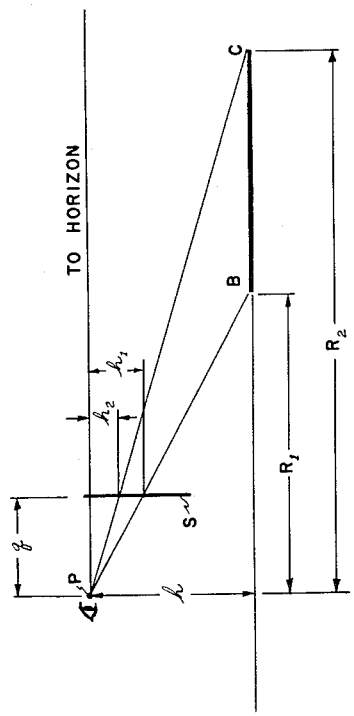
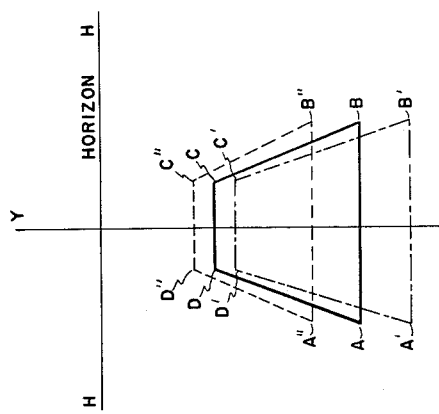
HAROLD S. HEMSTREET
INVENTOR

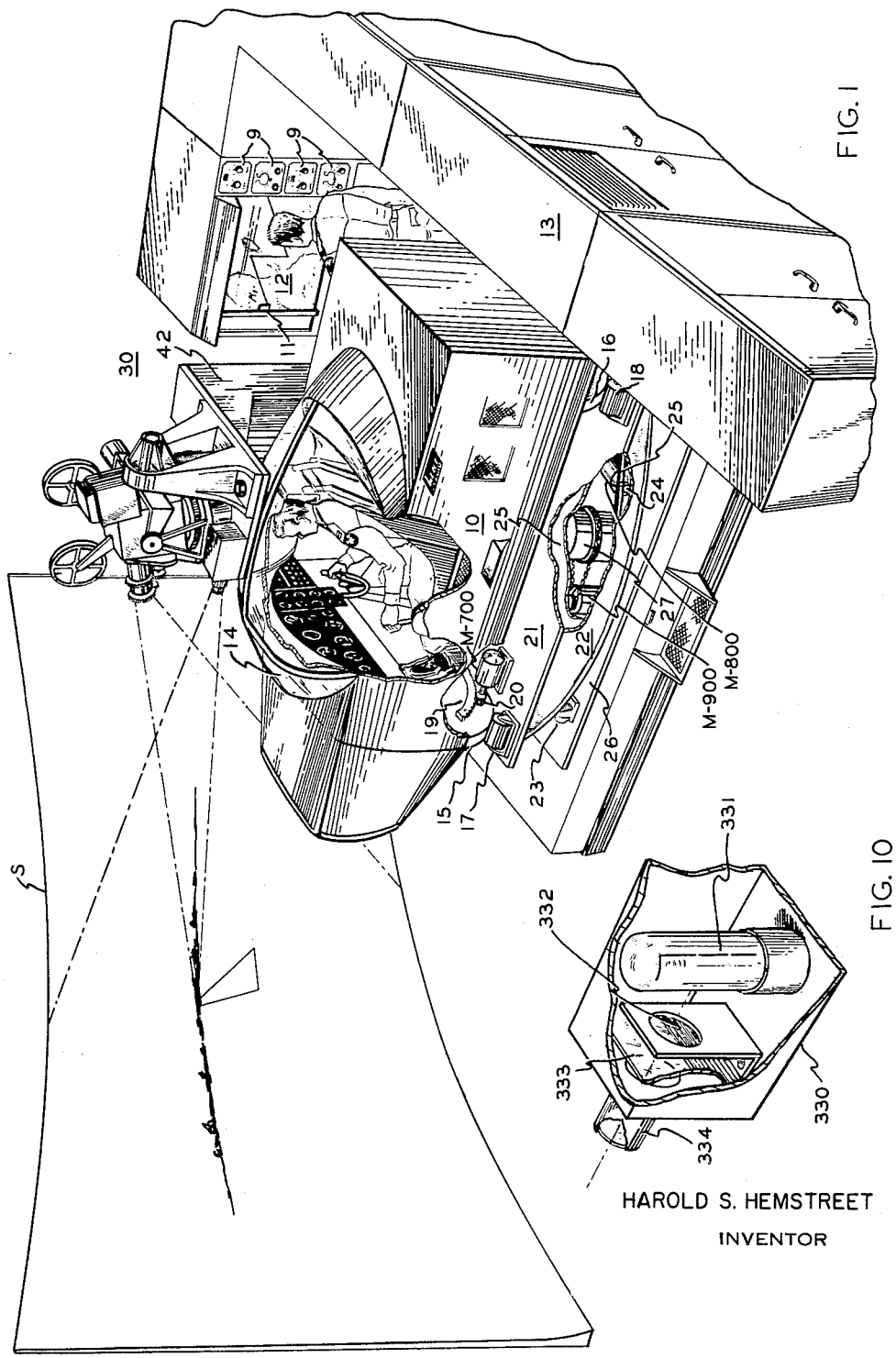

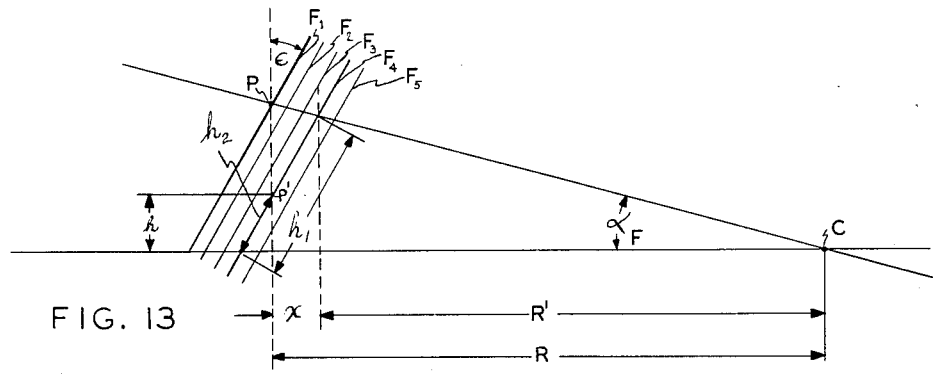
FIG. 13
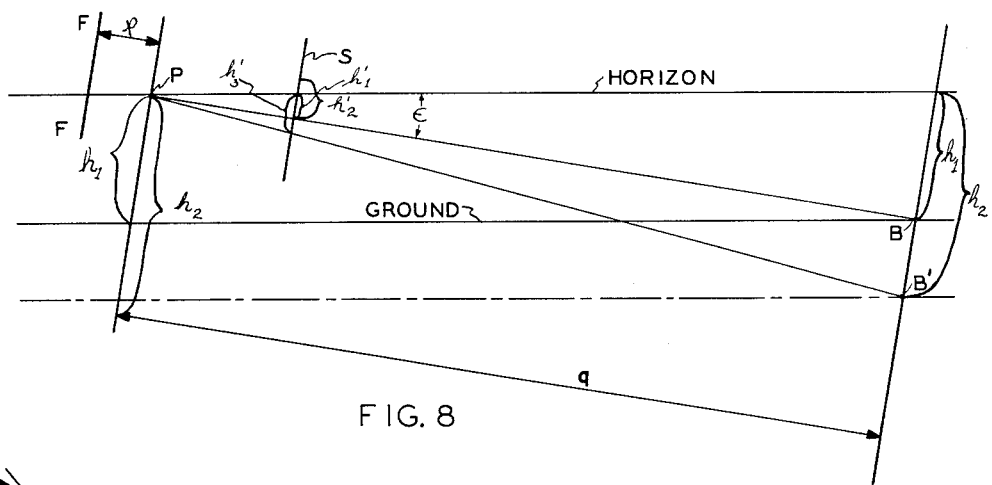
FIG. 8
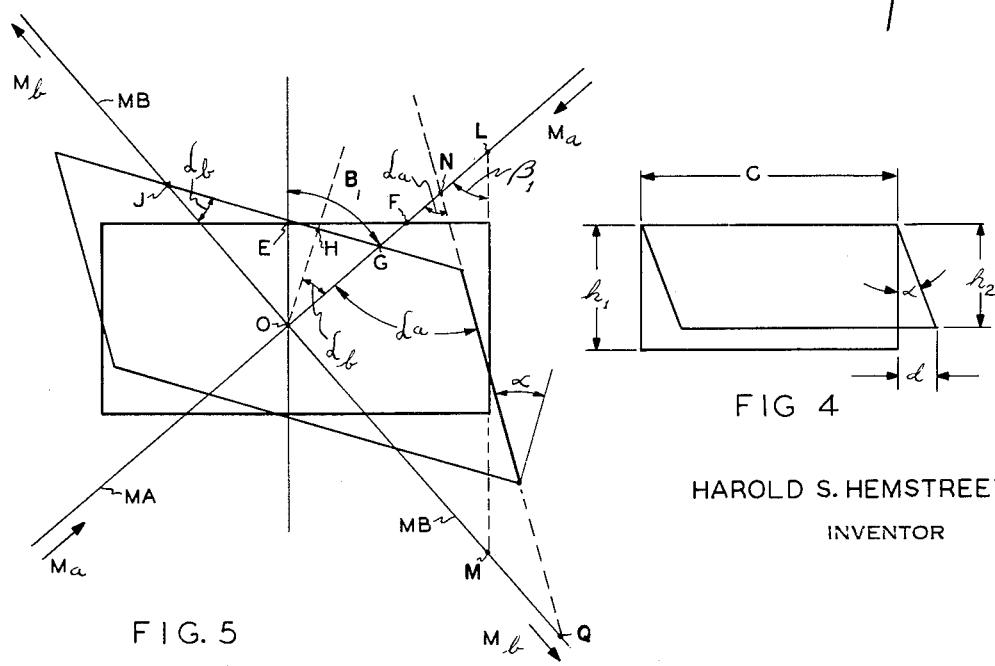
FIG. 5
FIG 4
HAROLD S. HEMSTREET
INVENTOR

HAROLD S. HEMSTREET
INVENTOR

July 19, 1966  H. S. HEMSTREET  3,261,912
SIMULATED VIEWPOINT DISPLACEMENT APPARATUS
Original Filed April 11, 1955  7 Sheets-Sheet 5

HAROLD S. HEMSTREET
INVENTOR

BY

ATTORNEY

HAROLD S. HEMSTREET
INVENTOR

BY

ATTORNEY

HAROLD S. HEMSTREET
INVENTOR

United States Patent Office 3,261,912
Patented July 19, 1966

3,261,912
SIMULATED VIEWPOINT DISPLACEMENT
APPARATUS
Harold S. Hemstreet, Wilton, Conn., assignor to General Precision, Inc., a corporation of Delaware
Application Nov. 6, 1962, Ser. No. 241,098, which is a division of application Ser. No. 500,325, Apr. 11, 1955, now Patent No. 3,101,645, dated Aug. 27, 1963. Divided and this application Apr. 8, 1965, Ser. No. 446,538
3 Claims. (Cl. 178—6.8)

This invention relates to a simulated viewpoint displacement apparatus for producing images having the appearance of areas as viewed from different viewpoints and is a division of my copending application Serial No. 241,098 filed November 6, 1962 which is a division of my prior copending application Serial No. 500,325 filed April 11, 1955, now Patent No. 3,101,645 issued August 27, 1963, which in turn is a continuation-in-part of my copending application Serial No. 480,033 filed January 5, 1955 now Patent No. 2,999,322 issued September 12, 1961 entitled "Visual Display Method and Apparatus" to which applications resort may be made as necessary, the present instant application showing an additional and improved means of providing simulated viewpoint displacement. The copending applications illustrate in some detail the utilization of particular embodiments of the invention in conjunction with grounded training apparatus. The instant application, as well as the disclosure of the previous applications shows apparatus and method of considerable use in conjunction with grounded trainers, as well as having general utility in altering the apparent perspective of images. The previous applications concerned methods and means for "distorting," or altering the apparent perspective of images of areas as seen from reference viewpoints so as to provide scenes such as would be viewed from points displaced from said reference viewpoints. One herein illustrated form of the invention utilized for grounded aircraft training provides alteration of the apparent perspective of the images of objects such as frames of a motion picture film in accordance with a simulated flight path in order to provide a realistic display to a student operating the grounded trainer. A motion picture may be made as a pilot flies a "reference" path, and then by providing controlled amounts of distortion of such picture in accordance with deviations of a simulated flight from such a reference path, a realistic visual display may be provided. The invention when used in conjunction with flight training apparatus also contemplates the provision of a plurality of images (such as motion picture films, for example) having the appearance of areas as viewed at successive points along a reference path, and the projection of such images to the operator of a grounded trainer with distortion necessary to provide scenes having the same perspective as scenes such as would be viewed at points displaced from the reference path.

The copending application illustrates the use of separate distorting means which independently distort an image, in one embodiment of said invention a variable magnification anamorphoser being provided to distort the image in accordance with vertical movement of the instantaneous viewpoint, and a rotatable prism or wedge being provided to accomplish "shear distortion," the sloping of an image in accordance with lateral movement of the instantaneous viewpoint. While the previous invention is of great value in producing the desired image distortion, the amount of shear distortion attainable without prohibitive aberration by means of the prism or wedge is sometimes undesirably limited in systems utilizing read-ily fabricated optical components, resulting in a limited range of allowable lateral displacement of the viewpoint. The invention provides improved method and means for accomplishing the required vertical and shear distortion incident to provision from a single image of scenes having the appearance of an area as viewed from numerous co-planer viewpoints, and cooperatively related distorting means are provided which produce the desired distortions in such a manner that increased ranges of displacement of the viewpoint may be allowed, and in which readily fabricated components are utilized. In one embodiment of the present invention such improved distorting means comprise a pair of variable magnification anamorphic lens combinations having their axes of variable magnification acting in different directions, and in an illustrated preferred embodiment of the invention such lens combinations act perpendicularly to each other to suitably distort the image. In another embodiment of the present invention cooperative electrical means are provided to distort the projected image in required manner.

It is therefore a primary object of the invention to provide new and improved means for altering the apparent perspective of images.

It is a further object of the invention to provide improved method and means for providing a visual display such as would be viewed from a selected viewpoint using objects having the appearance of an area as viewed from a viewpoint displaced from said selected viewpoint.

It is another object of the invention to provide improved method and means for providing visible displays of the type described which utilize cooperatively related means to alter the apparent perspective of projected images.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 1 is a perspective view of an exemplary form of grounded training apparatus adapted to use the invention, showing the general arrangement of such training apparatus;

FIGS. 2a and 2b are geometrical diagrams illustrating three different shapes a rectangular grounded surface may present perspectively when viewed from three different viewpoints differing in altitude;

Figure 6:
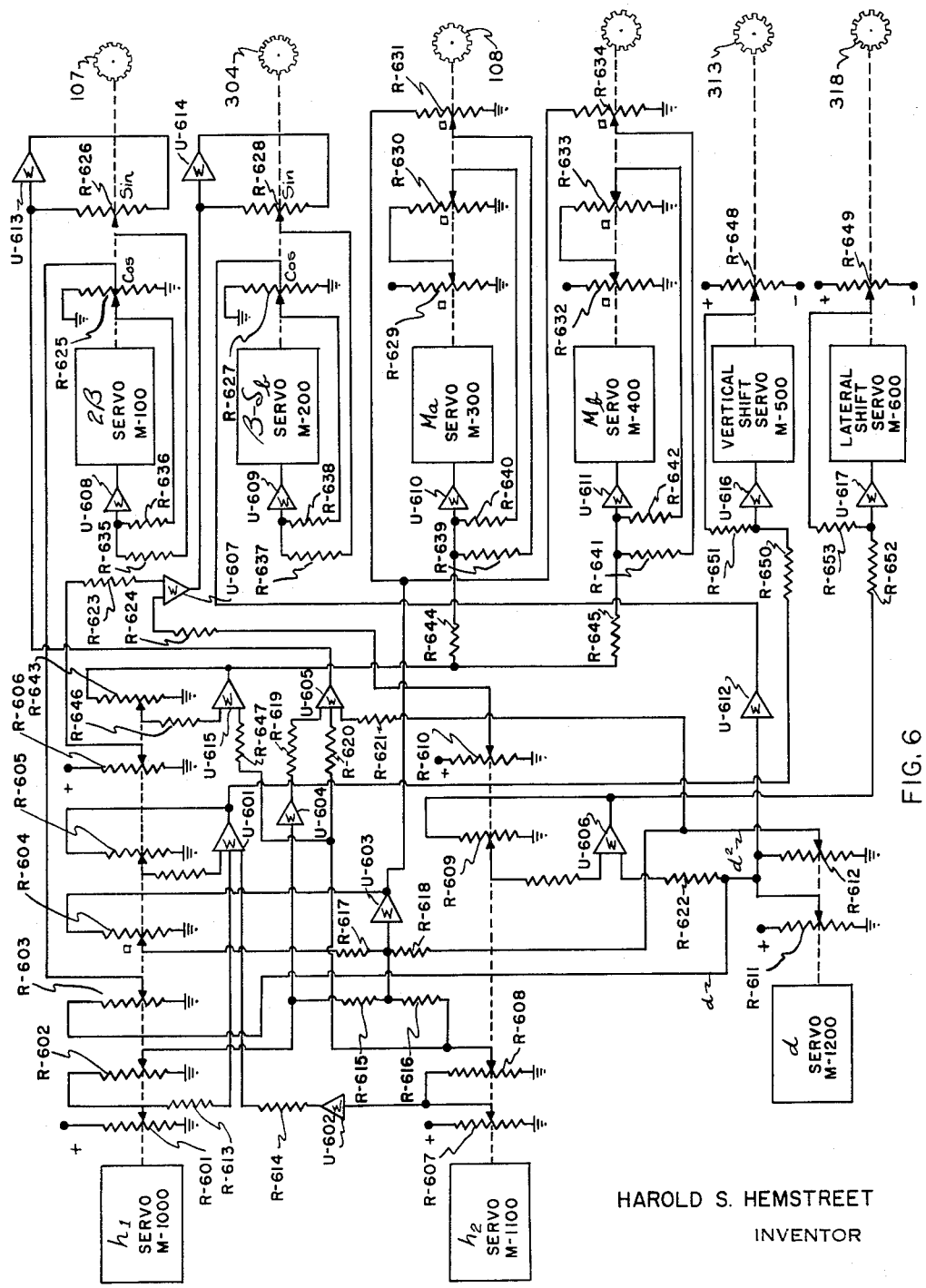
Figure 7:
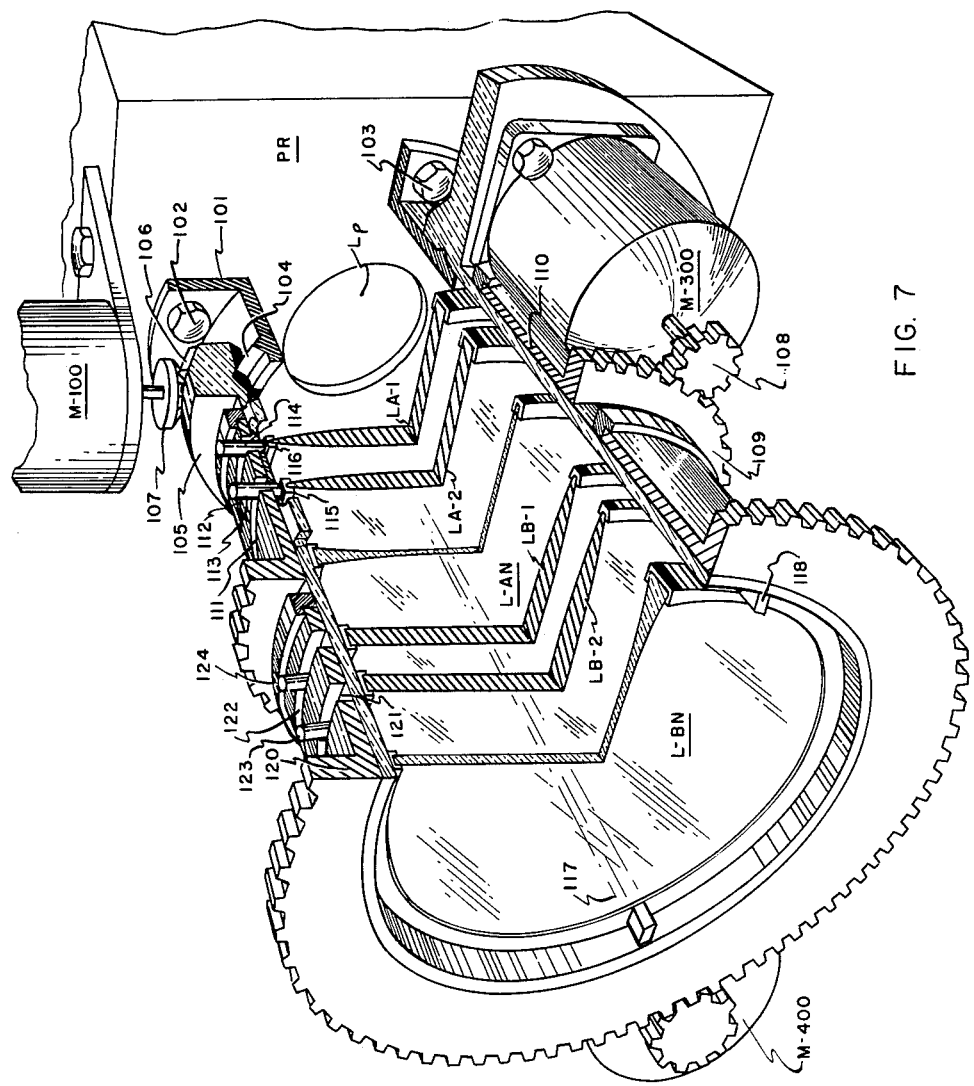
Figure 9:
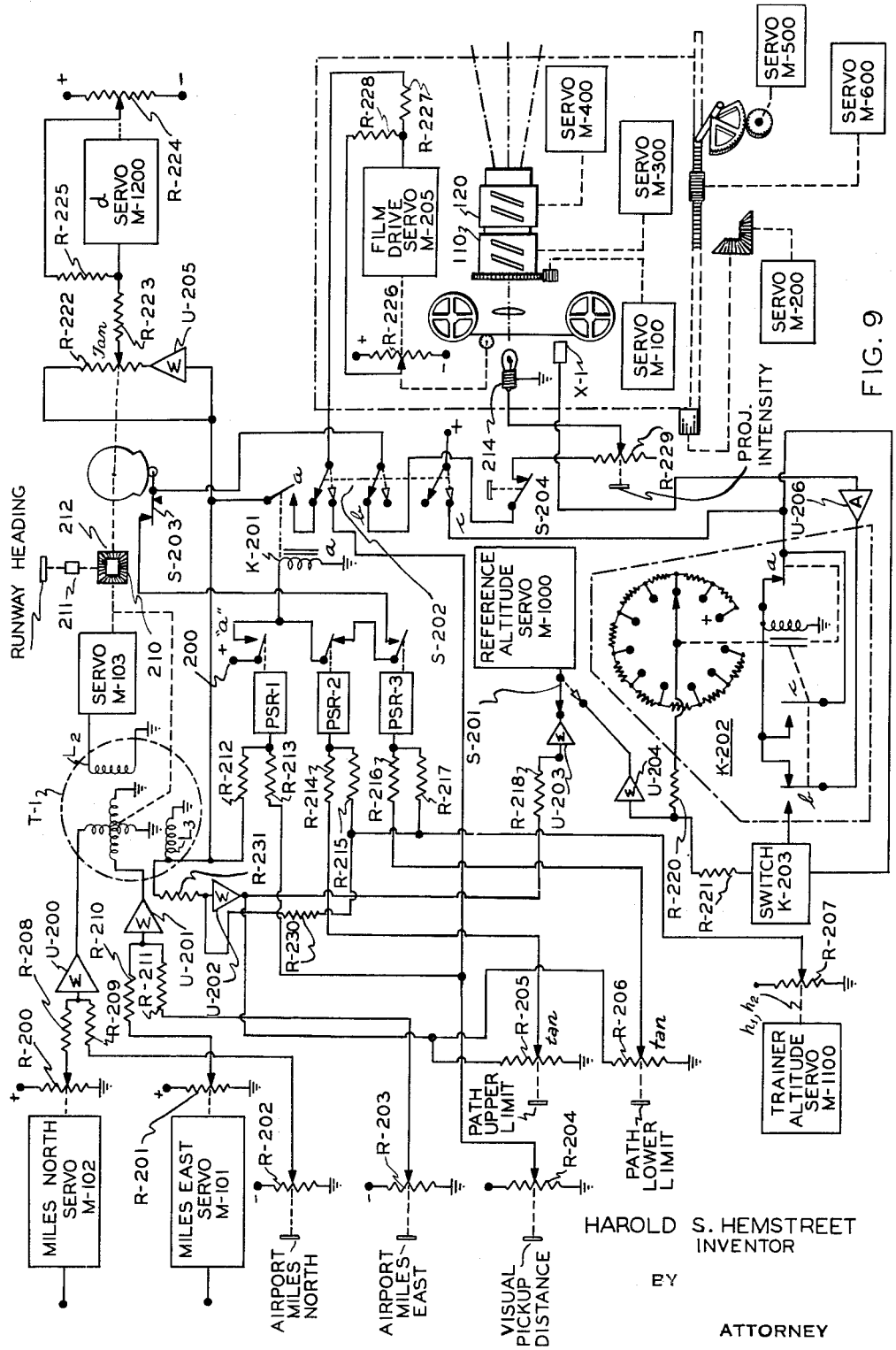
Figure 11:
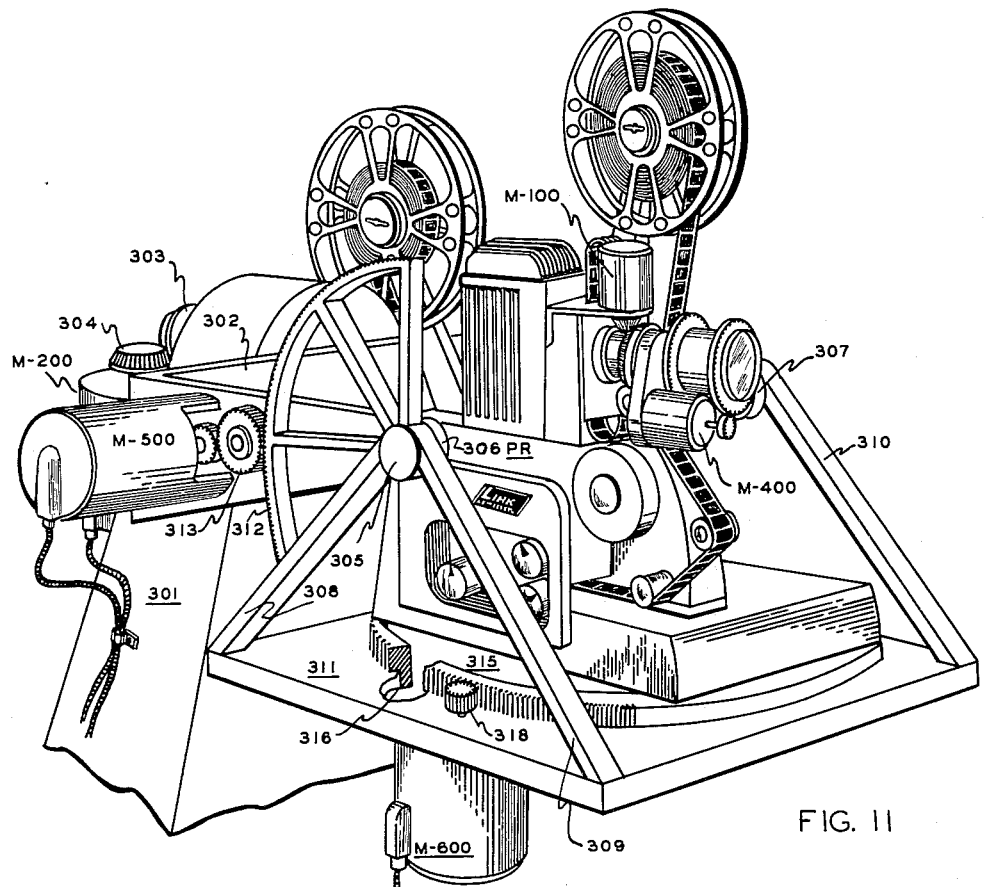
Figure 12:
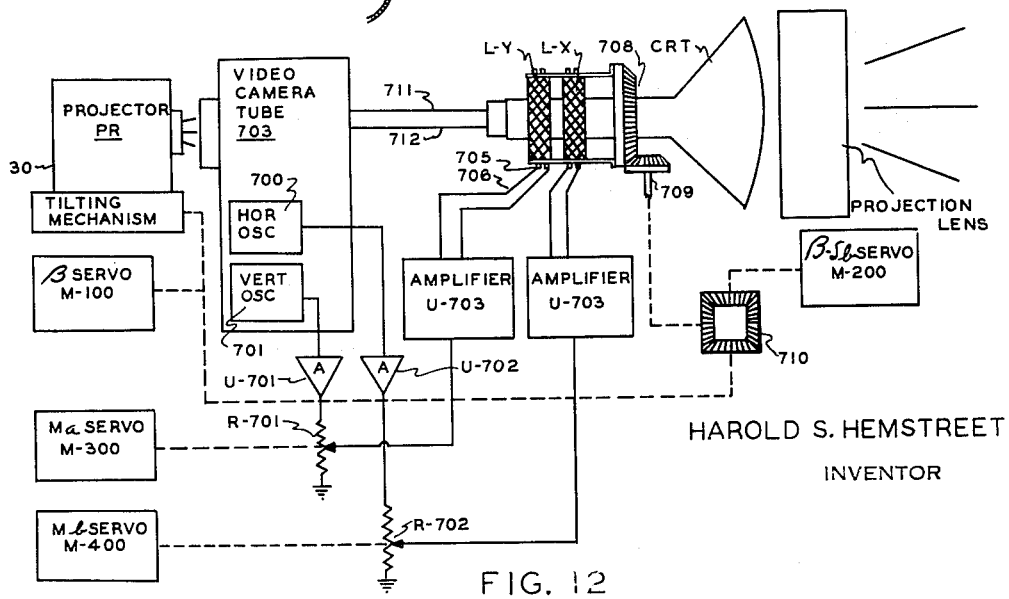

FIGS. 3a, 3b, and 3c are geometrical diagrams illustrating three different shapes a rectangular grounded surface may present perspectively when viewed from three laterally displaced viewpoints of the same altitude;

FIG. 4 is a geometrical diagram useful in illustrating the distortion required to simulate viewpoint displacement;

FIG. 5 is a geometrical diagram which taken in conjunction with FIG. 4 is useful in understanding the properties of perpendicularly acting variable anamorphic lens combinations;

FIG. 6 is an electrical schematic diagram of a preferred form of automatic control computer, which receives input data in accordance with the desired viewpoint displacement, and which provides output quantities to actuate properly the novel image distorting means of the invention;

FIG. 7 is a perspective drawing showing an exemplary form of optical distorting means constructed in accordance with the invention;

FIG. 8 is a geometrical diagram useful in understanding the occurrence of an unwanted vertical shifting of the distorted image as an incident to proper distortion of the image in some embodiments of the invention;

FIG. 9 is an electrical schematic diagram illustrating how the invention may be interconnected with a conventional grounded aircraft trainer to provide visual displays for use in grounded aircraft instruction;

FIG. 10 is a perspective and cutaway view of a simple projector which may be used with the invention to project simulated "sky" area;

FIG. 11 is a perspective view of an exemplary form of tilting mechanism which may be used with the invention to rotate the projector so as to position and align properly the distorted image on a viewing surface;

FIG. 12 is an electrical schematic diagram of an electrical distorting means constructed in accordance with the invention.

FIG. 13 is a geometrical diagram useful in understanding the operation of the film drive portion of the invention.

In all of the drawings like numerals refer to like parts.

FIG. 1 shows a specific arrangement of grounded training apparatus utilizing the invention for producing a visual display in conjunction with simulated aircraft flight. A mock-up of the cockpit of an actual aircraft is provided with dummy controls operable by a student pilot to provide indications on simulated instruments and indicators substantially duplicating those of an actual aircraft. The cockpit 10 may also include conventional simulated radio signalling equipment (not shown) by means of which the student pilot may "navigate." Situated near the cockpit is an instructor's station which may include duplicate simulated instruments, various controls 9, 9, for effecting special and emergency simulated flight conditions, and a conventional flight path recorder 11 to chart the ground track of simulated flight on a map 12. Grounded trainers commonly include a plurality of analogue computers which continuously solve the equations of motion of the simulated aircraft, providing shaft outputs and electrical potentials to operate the simulated instruments and indicators. Such computing apparatus may be contained in cabinets 13. Grounded trainers which are primarily intended for use in teaching instrument flying are usually provided with an opaque or translucent cockpit canopy, while in practice of the invention there is provided a canopy 14 of glass, plexiglass or equivalent material substantially simulating the transparent windshield of an aircraft. A plain white screen S is provided in front of the cockpit, the screen being preferably of a size sufficient to cover the entire area viewable by the student through canopy windshield 14. Low ambient light may be provided in the room in which the apparatus is situated, the intensity of such light being preferably that of a cloudy day. Cloud and lightning projectors known in the art may be utilized to simulate flight under various weather conditions by projecting appropriate images and shadows onto canopy 13 or screen S. When the apparatus is utilized for teaching night flying, extremely low ambient light may be provided to simulate night-time visibility conditions.

Cockpit 10 may be provided with arcuate rockers 15, 15 which are cradled upon rollers such as 17, 18 and similar rollers (not shown) on the starboard side of the cockpit. Rigidly affixed to rocker 15 is a ring gear segment 19, which is driven through pinion 20 by cockpit roll servomotor M-700. Hence rotation of servomotor M-700 serves to roll cockpit 10 about an axis determined by the center of curvature of rockers 15 and 16. Such center of curvature is preferably located substantially at the location of the eye of a student seated in the cockpit. Platform 21, upon which the cockpit and rolling mechanism is carried, is provided with arcuate rockers such as 22 cradled between rollers such as 23. Ring gear segment or actuate rack 24 may be seen through the cutaway portion of platform 21 to be rigidly attached to rocker 22 and meshed with pinion 25, so that rotation of cockpit pitch servomotor M-800 rotates the cockpit about an axis determined by the center of curvature of rocker 22 and its counterpart (not shown) on the starboard side of cockpit 10. Platform 26, which carries the above-described pitching mechanism, is carried by vertical shaft 26, which is rotatably supported at its lower end (not shown) and which is chain-driven by means of cockpit turning servomotor M-900. The line through the centers of curvature of rocker 22 and its counterpart, and the axis of vertical shaft 27 pass near or through the location of the eye of a student seated within the cockpit, so that cockpit pitching and turning motions occur about the student's viewpoint. Thus as the student views a scene projected upon screen S, the cockpit may roll, pitch and yaw in a manner similar to that of an actual aircraft. Servos M-700, M-800 and M-900 may be driven by the same signals utilized in conventional grounded trainers for positioning roll, pitch and heading servos. If desired, proprioceptive effects may be simulated by operating the cockpit motion servos in accordance with the invention disclosed in application Serial No. 441,570 by Laurence E. Fogarty filed July 6, 1954, for "Grounded Aircraft Trainer," which application is assigned to the same assignee as the present invention.

A motion picture projected upon screen S can be correct perspective-wise for only one position of view, and that position of view preferably should not change as the cockpit is rotated. By rotating the cockpit about axes coincident with the student's eye, the correct viewpoint perspective-wise may be maintained at the student's eye. An actual aircraft rotates about its center of gravity, which seldom corresponds to the viewpoint of the pilot. In those systems in which the cockpit is rotated to cause simulation of proprioceptive effects such as "seat-of-the-pants" reaction, it is usually desirable to rotate the cockpit about a point corresponding to the aircraft center of gravity. Since the perspective distortion caused by displacing the axis of cockpit rotation from the student's viewpoint is not serious in most embodiments of the invention, it is sometimes desirable to locate the axes of rotation at a compromise position between the student's viewpoint and the cockpit simulated center of gravity position.

Supported by column 42 a short distance above the cockpit and preferably as near as possible to the eye of the student situated within the cockpit is a motion picture projector PR disposed to project an image of a ground scene upon screen S for observation by the student. Projector PR may be mounted upon a tilting mechanism (indicated generally as 30) which allows rotation of the projector around three mutually perpendicular axes which coincide at the projection lens of projector PR. As will be further explained below, distortion of the projected image by means of the pair of anamorphosers causes unwanted shifting and rotation of the distorted image in some cases, and tilting mechanism 30 serves to rotate projector PR so as to compensate for the undesired shifting and rotation. A more detailed view of a specific tilting mechanism is shown in FIG. 11. It will be apparent to those skilled in the art that the precise form of tilting mechanism shown may be replaced by many other equivalent arrangements in practicing the invention.

Referring now in detail to FIG. 11 there is shown a pedestal 301 which rotatably supports a yoke 302. The neck (not shown) of yoke 302 comprises a shaft which is journalled in the upper portion of pedestal 301 and which carries a bevel gear 303 at its extremity. Bevel pinion 304 is driven by servomotor M-200, and being meshed with gear 303, yoke 302 is "rolled" about a generally horizontal axis in accordance with the shaft rotation of servomotor M-200. Since projector PR is rotated by rotation of yoke 302, it will be seen that by suitable operation of servomotor M-200, the projected image may be "rolled" about an axis defined by the axis of the neck of yoke 302. As will be further explained below, servomotor M-200 may be driven to rotate the projected picture by an $(\beta - \delta_b)$, which will be the amount of rotation necessary to maintain the horizon level on screen S as simulated viewpoint displacement occurs.

The outer ends of the arms of yoke 302 carry shafts such as 305 upon which are rotatably carried a pair of hubs 306, 307 of a platform support. Depending from hubs 306 and 307 are arms such as 308, 309 and 310 which carry pitching platform 311. Rigidly affixed to arm 308 and hub 306 is an arctuate gear segment 312 which meshes with pinion 313 rotatably supported on the arm of yoke 302. Servomotor M-500 is rigidly mounted on yoke 302 and its output shaft is geared to drive pinion 313, thereby rotating platform 311 about the axis of hubs 306, 307. As will be further explained below pitching of projector PR due to rotation of servomotor M-500 will serve to move the projected image up or down on the screen S to compensate for an unwanted vertical shifting obtained as an incident to distorting the image. Projector PR is mounted upon a circular bearing plate 315 rotatably supported in platform 311 as shown by the cutaway detail at 316. A toothed portion of the periphery of the flange portion of plate 315 meshes with pinion 318. Servomotor M-600 is rigidly mounted on platform 311 and its driving shaft rotates pinion 318, thereby rotating projector PR about an axis defined by the center of circular plate 315. Such rotation of projector PR serves to move the projected image right or left on screen S to compensate for an unwanted lateral shifting obtained as an incident to distorting the image. Projector PR is in most respects a completely conventional motion picture projector, having a few modifications which will be pointed out below. Mounted in front of the projection lens of projector PR is a distorting means which is shown in detail in FIG. 7. The three axes of rotation of projector PR are mutually perpendicular and may be made to coincide at the projection lens of projector PR. Such location of the axes of rotation is not mandatory, but it serves to simplify the apparatus utilized to derive suitable operating potentials for servomotors M-200, M-500 and M-600.

Referring again to FIG. 1, there is shown a sky projector 330 fixedly mounted on column 42. Projector 330, which is shown in greater detail in FIG. 10 serves to project an image of a blue or gray sky upon the upper portion of screen S. Projector 330 comprises a light source 331 shown as comprising a conventional projection lamp, a collimating lens 332, a sky image plate 333 and a projection lens 334. The upper portion of image plate 333 may be blued or frosted while the lower portion is opaque. It will be apparent that such an arrangement will provide a blue or gray sky image having a horizon line defined by the boundary between the opaque and translucent portions of plate 333. By varying the intensity of the voltage applied to lamp 331 the intensity of light in projected sky scene may be varied. As will be apparent this may be done with a simple rheostat (not shown).

As will be further explained below, the pictures which are projected may be taken with the optical axis of the camera maintained upon the horizon, in which case there will be no unwanted lateral or vertical shifting obtained as an incident to distorting the image. In such apparatus servomotors M-500 and M-600 and their attendent mechanism may be eliminated, and only the rotational correction supplied by servomotor M-200 need be provided. Maintaining the camera optical axis fixed on the horizon results in pictures which are half "sky," which is deemed a waste of half of the field of the camera, since "sky" may be simulated easily by a simple projector such as that shown in FIG. 10, and it is desirable in most cases to provide a display of as much ground area as possible.

Shown in FIG. 2a in heavy lines is a trapezoidal or keystone-shaped area ABCD such as the appearance in perspective a rectangular grounded surface might have when viewed at a point situated at a particular place in line with the centerline Y—Y of the area. From a position higher in altitude than the initial viewpoint, the area might have an appearance such as trapezoid A'B'C'D', and when viewed from a position lower in altitude than the initial viewpoint, the area might have an appearance such as trapezoid A"B"C"D". In FIG. 2a line H—H represents the horizon.

Shown in FIG. 2b is a side elevation view showing an eye situated at point P viewing a rectangular grounded surface at an altitude $h$ above said surface, the side BC of said surface being shown as a heavy line. It will be seen that if a screen S is placed a distance $q$ in front of viewpoint P, that a replica of the actual scene viewed from viewpoint P may be simulated by presentation of a proper scene on screen S. Assuming that screen S is mounted in a generally vertical position as shown, it map be seen that in order to effectuate a realistic presentation, that the distances of objects below the horizon on screen S must be inversely proportional to the horizontal distance between those points and the ground position of the viewpoint. For example, the distance $h_1$ on screen S between the horizon and the simulated near end AB of the grounded surface must be inversely proportional to $R_1$, the horizontal distance between viewpoint P and the actual near end AB of the grounded surface, or as may be seen by similar triangles:

$$h_1 = h \frac{q}{R_1}$$

Similarly, the distance $h_2$ on sceen S between the horizon and the simulated far end CD of the grounded surface is inversely proportional to $R_2$, the horizontal distance between viewpoint P and the actual distance to the far end of the surface, or that:

$$h_2 = h \frac{q}{R_2}$$

It may now be appreciated that for presentation of a scene such as that seen above a grounded surface, that increases in viewpoint altitude require proportionate increases in distances $h_1$ and $h_2$ of such scene, and that conversely, decreases in viewpoint altitude require proportionate decreases in distances $h_1$ and $h_2$ of such scene. Hence if a photograph were taken of a scene at a particular viewpoint, an appropriate "stretching" or "squeezing" of the image from such photograph with respect to the horizon would yield scenes such as those viewed at points above and below the point where the picture was taken.

Shown in FIG. 3 are appearances which a rectangular grounded surface might have when viewed from three viewpoints of the same altitude but varying in lateral position with respect to the grounded surface. FIG. 3b illustrates the scene which might be viewed from a viewpoint located on the centerline of the surface. FIG. 3a illustrates the same surface viewed from a viewpoint located a distance "a" to the right of the centerline of the surface, and FIG. 3c illustrates the same surface viewed from a viewpoint located a distance "b" to the left of the centerline of the surface. Superimposed upon each of FIGS. 3a, 3b and 3c in dashed lines is a rectangle representing a frame of a motion picture or a film which might be taken to project a simulated scene. It may be seen that the displacements a' and b' of the centerline of the film at the lower edge of the film frame are proportional to the ratio of the lateral displacement of the viewpoint to the altitude of the viewpoint. If pictures were taken so that the horizon in each picture is located along the upper edge of the frame, then the lateral displacement of any point in the picture from its position in FIG. 3b is proportional to the distance from the point to the top of the frame. Thus it may be seen that by providing distortion of an image varying in accordance with the magnitude of lateral displacement from a reference viewpoint and varying linearly from zero distortion at a horizon point to maximum distortion at a nearest location, that scenes varying in accordance with lateral displacement of a viewpoint may be produced. Thus it may be understood that by stretching or squeezing an image of an area with respect to its horizon or vanishing point, and by "shearing" the image linearly as described above, images may be produced which have the appearance of the area from various viewpoints. The distortion imposed as a result of lateral displacement of the viewpoint is termed "shear" distortion since it produces a shape similar to that produced by applying pure shear forces to an elastic member.

If the rectangle shown in FIG. 4 is a film frame or other object having the appearance of an area as viewed from a particular viewpoint, proper stretching or squeezing of the image of the object and proper shearing of the image of the object in the manner described above will result in the parallelogram image of FIG. 4, and the image produced by such distortion will represent the same area viewed from a different viewpoint. The relationship between dimensions of scenes as viewed from various viewpoints has been shown above, so that the required distortion to simulate a given change of viewpoint may be readily determined. I have discovered that a pair of perpendicularly-operating variable anamorphic elements may be utilized to provide the required distortions. For producing distortion to simulate a given viewpoint displacement, three relationships between the undistorted picture (rectangle) and the distorted picture (parallelogram) may be determined: (1) the ratio of heights, $h_2$ to $h_1$; (2) the angle $\alpha$; and (3) the fact that the horizon dimension ($c$ in FIG. 4) remains constant. The three above conditions may be utilized to determine three unknown conditions required to operate the anamorphic distorting means; namely, the power of the first of the anamorphic elements, the power of the second of the anamorphic elements, and the angular rotation of the pair. By determining the three unknown quantities and instantaneously or continuously actuating the anamorphic pair in accordance with such quantities, the required distortion to simulate a desired viewpoint displacement may be readily effected.

FIG. 5 is a geometrical diagram useful in understanding the ability of a pair of crossed anamorphic elements to suitably distort an image. The diagram shows a rectangle and a parallelogram, representing, respectively, an undistorted and a distored image of the same scene. MA represents the axis of variably magnification of a first variable anamorphic element, and MB represents the axis of variable magnification of the second variable anamorphic element. The anamorphic elements may be positioned so that axes MA and MB are perpendicular to each other as shown in FIG. 5. The two anamorphic elements may be rotated together, and in FIG. 5 they are shown rotated an angle $\beta$ about the system optical axis. The arrows along axis MA indicate that the image is compressed along axis MA by a first anamorphic element having a magnification of $M_a$ along axis MA, and the arrows along axis MB indicate that the image is expanded along axis MB by the second anamorphic element, which has a power of $M_b$ along axis MB.

By trigonometry:

$$\beta_1 = \beta_2 \tan \beta_1 = \tan \beta = \frac{OB}{OA} \qquad (1)$$

Since point D represents the same point relative to the distorted image (parallelogram) as point B is to the undistorted rectangle, it will be seen that line OB of the rectangle is expanded along axis MB by the second anamorphic element to a length OD, so that the relationship between lines OB and OD may be expressed as:

$$OD = (OB)(M_b) \qquad (2)$$

Similarly, the relationship between lines OC and OA may be determined to be:

$$OC = (OA)(M_a) \qquad (3)$$

By inspection, $$\tan \delta_a = \frac{OD}{OC}$$

Combining Equations (1), (2) and (3) and re-arranging:

$$\frac{M_b}{M_a} = \frac{\tan \delta_a}{\tan \beta} \qquad (4)$$

By similar process, the following expressions may be determined:

$$\frac{M_b}{M_a} = \frac{\tan \beta}{\tan \delta_b} \qquad (5)$$

The height of the undistorted images may be seen to equal twice distance OE, or:

$$OE = h_{1/2} \qquad (6)$$

The height of the distorted image may be seen to equal twice distance OH, or:

$$OH = \frac{h_2}{2} \qquad (7)$$

By inspection:

$$OF = \frac{OE}{\cos \beta} \qquad (8)$$

Since line OG of the parallelogram corresponds to line OF of the rectangle modified by the magnification $M_a$ of the first anamorphic element:

$$OG = M_a OF \qquad (9)$$

Combining Expressions (6) through (9):

$$OG = M_a \frac{h_{1/2}}{\cos \beta} \qquad (10)$$

Since angle $JOG = 90°$, angle JOH may be seen to equal $(90° - \delta_b)$, so that angle GOH equals $\delta_b$, and therefore:

$$OH = OG \cos \delta_b \qquad (11)$$

Combining expressions (7), (10), and (11), and re-arranging:

$$\cos \beta = \frac{h_1}{h_2} M_a \cos \delta_b \qquad (12)$$

By similar process but utilizing the known condition that the width of the rectangle is equal to the mean width of the parallelogram, the following expression may be determined:

$$\cos \beta = \frac{M_b \cos \delta_a}{\cos (\delta_a - \delta_b)} \qquad (13)$$

The angle $\alpha$ at which the image has been sloped by the anamorphic pair may be determined from FIG. 5 to be expressed as:

$$\alpha = \delta_a - \delta_b \qquad (14)$$

Applying Expression (14) to Expression (13):

$$\cos \beta = \frac{M_b \cos \delta_a}{\cos \alpha} \qquad (15)$$

By inspection of FIG. 4:

$$\tan \alpha = \frac{d}{h_2} \qquad (16)$$

The six Equations (4), (5), (12), (14), (15), and (16) may be seen to contain six unknowns ($\beta$, $M_a$, $M_b$, $\alpha$, $\delta_a$, $\delta_b$), so that they may be solved simultaneously. The required values of anamorphic magnification $M_a$, $M_b$ and the required rotation $\beta$ of both anamorphosers to provide the distorted picture desired may be determined.

Expressed in terms of sines and cosines and re-arranged, simultaneous Expressions (4), (5), (12), (14), (15), and (16) may be written as follows:

$$M_a \sin \delta_a \cos \beta = M_b \cos \delta_a \sin \beta \quad (17)$$
$$M_b \sin \delta_b \cos \beta = M_a \cos \delta_b \sin \beta \quad (18)$$
$$h_1 M_a \cos \delta_b = h_2 \cos \beta \quad (19)$$
$$\delta_a = \alpha + \delta_b \quad (20)$$
$$M_b \cos \delta_a = \cos \alpha \cos \beta \quad (21)$$
$$h_2 \sin \alpha = d \cos \alpha \quad (22)$$

The set of six simultaneous equations or equivalent expressions may be solved in accordance with well-known analogue computer technique as by provision of six servos, but the large number of interconnecting loops in such an arrangement requires in many embodiments of the invention that extensive stabilizing be provided, and the complexity of such an arrangement obviates ready analysis of its dynamic behavior. I therefore prefer to solve individually for the required input quantities, as will be further explained below.

If the film frames are taken with the optical axis of the camera maintained toward the horizon, projection of the pictures through the distortion means will provide the desired simulated viewpoint displacement if the correct values of $\beta$, $M_a$ and $M_b$ are provided, and if the entire optical system (including both the image and the distorting means) are rotated through the angle $(\beta - \delta_6)$, this rotation being necessary to maintain the horizon level. If the film frames are taken with the optical axis of the camera pointed toward the horizon, much of the angular field of the optical system will be wasted unless it is deemed desirable to include large amounts of "sky" in the picture. In producing visual displays for use in grounded aircraft training the simulation of "sky" may be effected very simply by other means, since "sky" area usually appears the same from all viewpoints. It is very desirable to utilize as much of the angular field of the optical system as possible for providing a display of grounded area, and hence it becomes desirable to take the film frames with the camera optical axis pointed well below the horizon. This will require shifting of the projected image both laterally and vertically, as will be further explained below.

Referring to FIG. 8 assume that the eye of an observer is located at point P an altitude $h_1$ (measured slant-wise as shown) above the ground. The area between the horizon and point B on the ground will be seen with a height $h_1$. If a projected image of a film in plane F—F taken from point P is cast onto screen S with a height $h_1'$ it will be seen that a faithful replica of the actual scene may be observed. If it be assumed that the film were taken and projected with the camera and projector optical axes lying along line PB at an angle of $\epsilon$ to the horizontal, it will be appreciated that the portion of the picture projected along line PB will not be displaced laterally or vertically. If simulation of an increase in viewpoint altitude (to an altitude of $h_2$ above the ground) is to be effected, it will be appreciated that as well as the picture being expanded to a new height $h_2'$ the undeviated axial portion of the picture must be re-directed downwardly so as to lie along line PB', providing an image having a height and location shown as $h_3'$ in FIG. 8. This may be accomplished by shifting the plane of the film downwardly (upwardly in projectors which invert the image) in the projector or by rotating the entire projector clockwise as viewed in FIG. 8. From inspection of FIG. 8, it may be seen that:

$$q = \frac{h_1}{\tan \epsilon}$$

so that the required shift of the film "vertically" in plane FF would equal:

$$\frac{h_2 - h_1}{h_1} p \tan \epsilon$$

where $p$ is the focal length of the projection lens system, or, assuming that the tangent equals the angle for small angles of rotation, the entire projector may be rotated about a horizontal axis in its lens plane through the angle:

$$\frac{h_2 - h_1}{h_1} \tan \epsilon$$

Since the film images are projected and distorted with reference to vertical and horizontal movement of the viewpoint within the film plane, it will be appreciated that the altitudes should be measured parallel to the film plane F—F, so that reference altitude $h_1$ of each film frame is actually the altitude at which the picture was taken divided by the cosine of the projection angle $\epsilon$. Since all film frames may be taken and projected at the same angle with respect to the horizontal, cos $\epsilon$ may remain constant, allowing the reference altitude of each film frame to be constant regardless of viewpoint displacement. By analysis similar to that above, it may be seen that if the optical axes of the camera and projector are not located along the horizon line, that the distorted image must be shifted *laterally* also, which may be accomplished either by lateral shift of the film itself in its own plane in accordance with $$p \tan \epsilon \frac{d}{h_2}$$

or by rotation of the projector about a vertical line through its projection lens in accordance with $$\tan \epsilon \frac{d}{h_2}.$$

In order to avoid mechanical complication of the projector shutter and film feed mechanism incident to shifting the film within the projector, I prefer to effect the above-mentioned vertical and lateral shifting by rotating the projector and thusly positioning the distorted image on the viewing screen. Computer apparatus connected so as to provide shaft outputs suitable for rotating the projector to provide the required amounts of vertical and lateral shift is shown and explained in FIG. 6.

Equations (17) through (22) also may be solved analytically, and the following expressions may be obtained for $M_o$, or $$\frac{M_b}{M_a}$$

the ratio between the powers of the two variable anamorphic means:

$$M_o^2 - M_o \left( \frac{d_2}{h_1 h_2} + \frac{h_1}{h_2} + \frac{h_2}{h_1} \right) + 1 = 0 \quad (23)$$

$$M_a M_b = \frac{h_2}{h_1} \quad (24)$$

The signs in expression (23) result from arbitrarily assuming that $M_b > M_a$. It will be apparent that $M_a$ and $M_b$ may be interchanged by rotating both the anamorphic means 90° with respect to the image to be distorted. Since Equation (23) is expressed in terms $h_1$, $h_2$ and $d$, known quantities for distortion required to simulate known movement of the viewpoint, it will be seen that solution of the equation for given values of $M_o$ will indicate the locus of viewpoints which may be simulated with a given ratio of anamorphoser powers. Re-arrangement of Equation (23) to the following form indicates that each value of anamorphic pair power ratio $M_o$ will provide displacement of the viewpoint in a circle centered at a $d = o$ point:

(25)

$$d^2 + \left[ h_2 - \frac{h_1}{2} \left( M_o + \frac{1}{M_o} \right) \right]^2 = h_1^2 \left[ \frac{\left( M_o + \frac{1}{M_o} \right)^2}{4} - 1 \right]$$

Solving the simultaneous equations analytically, one also may obtain an equation for the angle $\beta$ in terms of the anamorphic power ratio:

$$\sin 2\beta = \frac{2d}{h_2\left(M_o - \frac{1}{M_o}\right)} \quad (26)$$

Since $M_b$ was assumed to be greater than $M_a$, the value of $\beta$ will be equal to or less than 45° if $h_1^2 > h_2^2 + d^2$, or will be equal to or more than 45° if $h_1^2 < h_2^2 + d^2$.

Using Expressions (23) and (24), expressions may be obtained which describe the loci of viewpoints obtained with constant values of $M_a$ and $M_b$:

$$\frac{h_2^2}{h_1^2 M_a^2} - \frac{d^2}{h_1^2(1 - M_a^2)} = 1 \quad (27)$$

$$\frac{h_2^2}{h_1^2 M_b^2} + \frac{d^2}{h_1^2(M_b^2 - 1)} = 1 \quad (28)$$

Equation (27) indicates that the paths of viewpoints simulated by constant values of $M_a$ are a system of hyperbolas, and Equation (28) indicates that the paths of viewpoints simulated by constant values of $M_b$ are ellipses.

In similar fashion the following expression may be obtained to describe the loci of viewpoints using a constant angle $\beta$:

$$\left(d - \frac{h_1}{2}\right) + h_2^2 = h_1^2\left(1 + \frac{\beta^2}{4}\right) \quad (29)$$

Where $\beta = \left(\tan \beta - \frac{1}{\tan \beta}\right)$

Expression (29) indicates that the loci of viewpoints obtained using a constant angle $\beta$ are a family of circles which pass through the $h_1$ point.

The following expression for the angle $(\beta - \delta_b)$ through which the distorted image must be rotated in order to maintain the horizon line in the same place also may be obtained:

$$\tan (\beta - \delta_b) = \frac{d}{h_1 + h_2} \text{ or,}$$

$$(h_1 + h_2) \sin (\beta - \delta) = d \cos (\beta - \delta_b) \quad (30)$$

As an alternative to the abovementioned computer simultaneously solving Equations (17) through (22), I prefer to build separate computers which solve for their own individual quantity from input data applied in terms of the known viewpoint displacement quantities $h_1$, $h_2$ and $d$, as by means of servo solution of Expressions (27), (28), (29), and (30), or modified forms of these expressions. It may be noted that Expressions (27), (28), and (29) are each quartic equations making four solutions of each equation mathematically possible, and hence it is necessary that the computers be connected so that the correct solution is always selected, as will be further explained below.

Equation (27) may be re-arranged to the following form:

$$M_a^4 - M_a^2\left(\frac{h_2^2 + h_1^2 - d^2}{h_1^2}\right) + \left(\frac{h_2}{h_1}\right)^2 = 0 \quad (31)$$

Equation (28) may be re-arranged to the following form:

$$M_b^4 - M_b^2\left(\frac{h_2^2 + h_1^2 + d^2}{h_1^2}\right) + \left(\frac{h_2}{h_1}\right)^2 = 0 \quad (32)$$

Equation (29) may be reduced and re-arranged to the following form:

$$2dh_1 \cos 2\beta + (h_2^2 + d^2 - h_1^2) \sin 2\beta = 0 \quad (33)$$

Shown in FIG. 6 in electrical schematic form is computing apparatus which solves Equations (30), (31), (32) and (33) to provide shaft outputs to actuate the novel distorting apparatus of the invention so as to provide simulated viewpoint displacement for use with a conventional grounded aircraft trainer. In FIGS. 6, 9 and 12 certain well-known analogue computer apparatus is shown in block form, and certain parts which would ordinarily be used in constructing commercially acceptable apparatus are omitted for sake of clarity. For example, in the construction of analogue computers buffer amplifiers are often used in numerous parts of a system to prevent loading errors and to affect scaling of the computing potentials and other amplifiers are used solely for polarity inversion. Each of the servomechanisms shown may comprise conventional grounded trainer servomechanisms, and each may include a tachometer generator or other rate feedback device for stabilization and anti-hunt purposes. Either alternating current or direct current computation may be used, and the alterations of the apparatus to convert from one system to the other will be readily apparent to those skilled in the art. Mechanical and electrical limit switches ordinarily utilized to prevent overtravel of various parts of the apparatus have been omitted for sake of clarity. Reduction gearing between the servomotors and driven apparatus has not been shown. Shown in block form and indicated as M–1000 is a conventional grounded trainer servomechanism which is positioned as will be shown in FIG. 9 and which provides a shaft position according to the altitude $h_1$ of the reference viewpoint, which in systems utilizing film images will constitute the instantaneous effective altitude at which each film frame was exposed, divided by a constant, the cosine of the projection angle $\epsilon$, as discussed with FIG. 8. The reference altitude $h_1$ may be termed the "effective" altitude at which the picture was taken since the picture need not necessarily have been actually taken at that altitude. In providing films for use with the apparatus described, anamorphosers may be utilized on the camera to provide films having the appearance of being taken from viewpoints displaced from the actual camera location, or, anamorphosers may be utilized on the film printer to insert a variation in apparent perspective between the camera film and the projector film. Shown as M–1100 is a conventional grounded trainer altitude servo which provides an output shaft position commensurate with $h_2$, the instantaneous altitude $h$ of simulated flight, also divided by a constant cos $\epsilon$. The constant cos $\epsilon$ may be effected by resistance scaling. The invention will operate to distort the image of each film frame taken at its $h_1$ altitude to provide a scene such as would be seen at the $h_2$ altitude then being "flown" by the grounded trainer. Shown in block form as M–1200 is a lateral displacement servo M–1200 which is positioned in accordance with deviation of the path of simulated flight from a reference path as will be shown in FIG. 4 and which continuously provides an output shaft position commensurate with the lateral displacement $d$ in the viewpoint plane between the point at which the film frame being projected was taken and the simulated aircraft position.

A constant potential from the computer power supply is applied to excite the winding of potentiometer R–601, the arm of which is positioned by the $h_1$ servo M–1000, applying a potential proportional to $h_1$ to excite potentiometer R–602, the arm of which is also positioned by servo M–1000, thereby deriving a potential commensurate with $h_1^2$ on the arm of potentiometer R–602. As will be apparent to those skilled in the art, linear function potentiometers R–601 and R–602 may be replaced by a single square function potentiometer if desired. The $h_1^2$ potential on the arm of potentiometer R–602 is applied through feedback amplifier U–604 and resistance R–619 to the input circuit of feedback summing amplifier U–605, amplifier U–604 serving to reverse the polarity of the potential. Potentiometer R–607 is excited by a constant supply potential and its arm is positioned by the simulator altitude servo M–1100, thereby applying an $h_2$ potential to potentiometer R–608, the arm of which is also positioned by servo M–1100, thusly deriving an $h_2^2$ potential on the arm of potentiometer R–608. The $h_2^2$ potential is applied via resistance R–620 to the input circuit of summing amplifier U605. A $d^2$ potential is derived in similar manner and applied to the input circuit of amplifier U–605 via summing resistance R–621. Summing amplifier U–605 combines the input potentials applied via resistors R–619, R–620 and R–621, providing an output potential commensurate with $h_1^2-h_2^2-d^2$. This potential is applied directly and through polarity inversion amplifier U–613 to excite opposite ends of sine potentiometer R–626. Potentiometer R–603 is excited with a lateral displacement voltage $d$ from potentiometer R–611, and since the arm of potentiometer R–603 is positioned by $h_1$ servo M–1000, a potential commensurate with $2dh_1$ may be applied to excite the winding of cosine potentiometer R–625. Those skilled in the art will recognize that the constant multiplier 2 may be effected by appropriate resistance scaling. Servo M–100 positions itself in accordance with the angle $2\beta$ by solving Equation (33), the first term of the equation being applied to summing amplifier U–608 and the servomechanism via resistor R–636, and the second term being applied via resistor R–635. As will be apparent, servo M–100 will run until the two applied inputs cancel each other, at which time its shaft position will be proportional to the angle $2\beta$. As shown in FIG. 7, servomotor M–100 drives gear 107 and angularly positions the anamorphic distorting pair in accordance with the angle $\beta$, the factor of two being effected by the gear ratio. Rather than by solving Equation (30) as shown in FIG. 6, the $\beta$ shaft position may be derived by solution of equations such as expression (29), but the use of Expression (29) is deemed preferably because the sine and cosine terms may be derived easily using readily available analogue computer resolvers. The system of either equation however, may yield either of two answers. By providing the proper polarity excitation to $\beta$ servomotor M–100 the desired root may be selected. Reversing the polarity of such excitation will cause servo M–100 to rotate $2\beta$ through 180° (i.e. $\beta$ thru 90°) to select the other root.

As seen in FIG. 6 potentials commensurate with $h_1^2$, $h_2^2$ and $d^2$ are applied from potentiometers R–602, R–608 and R–612, respectively, through resistances R–615, R–616 and R–618 respectively to the input circuit of feedback amplifier U–603. The output potential from amplifier U–603 is applied to excite square function potentiometer R–604, the arm of which is positioned in accordance with reference altitude $h_1$ by servo M–1000, and the potential on the arm of potentiometer R–604 being applied via resistor R–617 to the input circuit of amplifier U–603. As will be readily apparent to those skilled in the art, such cnnection modifies the output potential of amplifier U–603 so as to provide an output proportional to $(h_1^2-h_2^2+d^2)$ divided by $h_1^2$. This output potential, which may be seen to equal the first bracketed quantities in Equations (31) and (32) is applied to excite square function potentiometers R–631 and R–634. The arm of square function potentiometer R–631 is positioned in accordance with $M_a$, the required magnification of the first anamorphic element, by servo M–300, which solves Equation (31), applying a potential commensurate with the second term of Equation (31) to the input circuit of the servo via summing resistor R–639 and summing amplifier U–610. A constant potential from the computer power supply excites the winding of square function potentiometer R–629, and the $M_a^2$ output is applied to excite square function potentiometer R–630, thusly deriving an $M_a^4$ potential for application to servo M–300 via summing resistor R–640 and amplifier U–610. To provide the third term of Equation (31) the $h_2^2$ potential from potentiometer R–608 is applied via resistor R–647 as one input to amplifier U–615. The output of amplifier U–615 excites square function potentiometer R–643, which is positioned by servo M–1000, and the potential on the arm of potentiometer R–643 is applied via resistor R–646 to amplifier U–615, providing an output potential from U–615 proportional to $$\left(\frac{h_2}{h_1}\right)^2$$

This potential as applied via summing resistor R–644 to amplifier U–610 and via summing resistor R–645 to amplifier U–611. Hence servos M–300 and M–400 are supplied with input quantities in accordance with Equations (31) and (32), and by continuously solving the equations, shaft positions proportional to the required anamorphic magnifications are provided. As shown in FIG. 7, servos M–300 and M–400 vary the magnifications of the anamorphic pair by axially positioning lenses.

Servos M–300 and M–400 may comprise identical servomechanisms, except that their quadrature excitations are of opposite polarity. Although there are four possible solutions of the quartic equation solved, the servos may be prevented by conventional mechanical limits (not shown) from seeking "negative power" solutions, and by providing the proper direction of operation for a given polarity input signal, the servos will each position themselves to the desired roots. As is well known in the analogue computer art, reversing the direction of operation of a servo for a given polarity input will cause a servo connected to solve a quadratic equation to seek the other root.

A constant potential from the computer power supply is applied to excite the winding of potentiometer R–606, the arm of which is positioned by servo M–1000, applying an $h_1$ potential to amplifier U–607 via resistor R–623. Similarly, an $h_2$ potential is derived by potentiometer R–610 and applied via resistor R–624 to amplifier U–607. The output from amplifier U–607 is applied both directly and through amplifier U–614 to excite opposite terminals of sine potentiometer R–628. The potential proportional to lateral displacement $d$ from potentiometer R–611 is inverted in polarity by amplifier U–612 and applied to excite the winding of cosine potentiometer R–627. Servo M–200 provides an output shaft position commensurate with the angle $(\beta-\delta_b)$, so that a $(h_1+h_2)$ sine $(\beta-\delta_b)$ potential is applied to amplifier U–609 via resistor R–638, and a $d$ cost $(\beta-\delta_b)$ potential is applied via resistor R–637 to amplifier U–609. Servo M–200 will thusly rotate until these two inputs are equal in magnitude and opposite in polarity, at which time the shaft position of servo M–200 will be a measure of the angle $(\beta-\delta_b)$, and the servo will have solved equation (30).

The $h_1$ potential on the arm of potentiometer R–601 is applied via resistor R–613 to feedback amplifier U–601. The $h_2$ potential on the arm of potentiometer R–607 is inverted in phase by amplifier U–602 and applied to amplifier U–601 via resistor R–614. The output potential from amplifier U–601 is modified in accordance with reference altitude $h_1$ by potentiometer R–605 and applied to the input circuit of amplifier U–601 so that the resultant potential output from amplifier U–601 is proportional to $$\frac{h_2-h_1}{h_1}$$

This output potential is applied via resistor R–650 and amplifier U–616 to position servo M–500. A conventional follow-up potentiometer R–648 is provided on the shaft of servo M–500 to provide re-balancing voltage.

The lateral displacement or $d$ potential on the arm of potentiometer R–611 is applied via resistor R–622 to amplifier U–606. The output potential of amplifier U–606 is modified in accordance with simulated altitude $h_2$ by potentiometer R–609 and fed into amplifier U–606 so that the resultant output potential of amplifier U–606 is proportional to $d/h_2$. This potential is applied via resistor R–652 and amplifier U–617 to position servo M–600. Follow-up potentiometer R–649 provides re-balancing potential for servo M–600 in conventional manner. Servo M–500 shifts the distorted picture vertically and servo M–600 shifts the distorted picture laterally as explained in connection with FIG. 8 to establish the projected image in the right place on the viewing surface.

Shown in FIG. 7 is a perspective view of a specific embodiment of the distorting means of the invention. The distorting means comprises a pair of mutually perpendicular anamorphic distorting elements attached to distort the image from a conventional motion picture projector. Axially aligned with the projector optical axis and fitted over the projection lens $L_p$ of projector PR is a cylindrical bearing hub 101 which is rigidly mounted on the projector case as by means of bolts 102, 103. Around the periphery of hub 101 a bearing portion 104 is provided to accommodate a cooperating groove in the base portion of lens barrel 105, which is thereby rotatably secured to the projector. Gear teeth may be provided around lens barrel 105 as shown at 106. Bevel gear 107 meshes with the teeth on lens barrel 105, so that rotation of motor M–100 serves to rotate lens barrel 105 about the optical system axis. The base portion of lens barrel 105 carries motors M–300 and M–400, which are likewise moved bodily around the system optical axis upon rotation of motor M–100. Pinion 108 meshes with a toothed surface 109 extending around the periphery of sleeve 110, so that rotation of motor M–300 rotates sleeve 110 around the lens barrel 105. Sleeve 110 is provided with two non-linear cam slots 111, 113 which engage pins 113, 114. Pins 113 and 114 extend through longitudinal slots out in lens barrel 105 so that pins 113 and 114 are constrained against rotation about the optical axis but move parallel to the system optical axis upon rotation of sleeve 110. Pins 113 and 114 are rigidly affixed to the mounting rings 115 and 116, respectively, of positive cylindrical lenses L–A2 and L–A1, so that longitudinal movement of pins 113 and 114 moves lenses LA–1 and LA–2 along the system axis, the lens mounting rings 115 and 116 being guided as by means of keyways 117, 118. Also provided within lens barrel 105 is a negative cylindrical lens L–AN which is fixedly mounted within lens barrel 105. Thus it may be seen that rotation of sleeve 110 by means of motor M–300 will serve to position positive cylindrical lenses LA–1 and LA–2 with relation to negative cylindrical lens L–AN. Lenses LA–1, LA–2 and L–AN each may be seen to be cylindrical in a vertical direction as viewed in FIG. 7.

Motor M–400 positions sleeve 120 about lens barrel 105 in the same manner that motor M–300 positions sleeve 110. Pins 123 and 124 are translated longitudinally by cam slots 121 and 122, respectively, axially moving positive cylindrical lenses LB–1 and LB–2 with respect to fixed negative cylindrical lens L–BN. Lenses LA–1, LA–2 and L–AN comprise a first variable anamorphic means, and lenses LB–1, LB–2 and L–BN comprise a second variable anamorphic means. Lenses LB–1, LB–2 and L–BN are each cylindrical in a horizontal direction as viewed in FIG. 7, and hence it may be seen that the two anamorphic means are perpendicularly disposed. That appropriate axial movement of a pair of positive cylindrical lenses with respect to a fixed negative cylindrical lens will provide variable magnification in one direction without de-focus is explained in detail in my abovementioned copending application and need not be repeated herein. The invention is not limited, however, to the precise form of anamorphic means herein employed (two positive and one negative lenses), and it will be readily apparent to those skilled in the art that pairs of perpendicularly disposed anamorphic means using other lens element combination may be substituted for the precise form of variable anamorphic means shown without departing from the invention. As will be further explained below, rotation of motor M–100 serves to rotate the anamorphic pair distorting means through the angle $\beta$ required to simulate a desired viewpoint displacement, motor M–300 serves to position the lenses LA–1 and LA–2 to provide the first anamorphic power $M_a$ required to simulate the desired viewpoint displacement, and motor M–400 serves to position lenses LB–1 and LB–2 to provide the second anamorphic power $M_b$ required to simulate the desired viewpoint displacement. The positioning of motors M–100, M–300 and M–400 will distort the image from projector PR so as to provide a distorted image having the correct shape to simulate the view as seen from the desired viewpoint, but it will be further necessary to rotate the distorted image through an angle of $\beta - \delta_b$ in order that originally horizontal objects remain horizontal in the distorted picture, and in systems using images taken with the camera axis below the horizon, to shift the distorted image vertically and laterally. These three further corrections may be made by rotating the entire projector system (including the anamorphic distorting pair) through the angle $\beta - \delta_b$ and by displacing the original image in the projector vertically and laterally with respect to the anamorphic distorting pair. In providing a visual display for use with grounded trainers, I usually prefer to rotate the entire projector system relative to the observer through the $(\beta - \delta_b)$ angle, and to move the distorted image vertically and laterally on the screen by appropriately rotating the entire projector, as is shown in detail in FIG. 11.

Shown in FIG. 9 is an exemplary electrical control system which may be utilized to interconnect the previously described optical system to a conventional grounded trainer so as to provide realistic visual displays. Modern grounded aircraft trainers or simulators are commonly provided with integrating or velocity servos responsive to potentials representing components of simulated ground speed in two directions, usually termed "northerly" and "easterly", and which servos integrate the component potentials with respect to time, producing as shaft outputs quantities representing simulated aircraft distances with respect to a reference point on the ground. A recording pen is commonly actuated by such shaft outputs to trace the cause of simulated flight on a map for observation by the instructor. If it is desired to produce a realistic visual display during both simulated takeoffs and landings a swell as simulated flight in the air, and if wind conditions are also to be simulated, it is important that the simulated aircraft distance quantities derived be accurate measures of the aircraft location with respect to a fixed point during takeoffs and landings as well as airborne flight. To provide such quantities, the invention may be used, for example, in conjunction with the computer apparatus disclosed in application Serial No. 477,741 filed December 27, 1954 by Laurence E. Fogarty for "Aircraft Trainer Apparatus", which application is assigned to the same assignee as the present invention, and which application discloses means for providing the desired quantities during all phases of a simulated flight, while realistically taking into account the effects of wind. In the apparatus of FIG. 9 servos M–102 and M–101 may comprise such integrating servos. Servo M–102, the position of which represents the distance of the simulated aircraft "north" of the reference point, positions the arm of potentiometer R–200, the winding of which is excited with a constant excitation from the conventional grounded trainer computer power supply, deriving a potential commensurate with "miles north" of the simulated aircraft from the reference point, which potential is applied via resistor R–208 to summing amplifier U–200. Servo M–101 and potentiometer R–201 similarly derive a "miles east" potential which is applied via resistor R–210 to amplifier U–201. Potentiometers R–202 and R–203 are provided with control knobs manually positionable by the instructor so that the arms of potentiometers R–202 and R–203 may be positioned in accordance with a desired northerly distance and a desired easterly distance, respectively, of a simulated airport from the reference point. The windings of potentiometers R–202 and R–203 are excited from the computer power supply with constant potentials having an instantaneous polarity opposite to those potentials applied to excite potentiometers R–200 and R–201. Since the station location potentials from potentiometers R–202 and R–203 are applied (via resistors R–209 and R–211) to amplifiers U–200 and U–201, in opposite sense to the aircraft location potentials, it will be seen that the difference output potentials from the amplifiers will represent northerly and easterly distances of the instantaneous flight position of the simulated aircraft from the selected airport location. These difference potentials are each applied individually to one rotor coil of a conventional induction resolver T–1. The resultant voltage induced in stator coil $L_2$ of resolver T–1 is applied to a conventional servo M–103, the output shaft of which rotates the rotor coils until minimum voltage is induced in coil $L_2$. This causes servo M–103 to provide an output shaft position representing the angle between the bearing from simulated aircraft to simulated airport and a north or east reference direction. At balance the potential induced in resolver stator coil $L_3$ will be a maximum, and will be proportional to the vector sum of the potentials applied to the rotor, representing in magnitude the resultant distance between the simulated aircraft and the selected simulated airport site. This resultant distance potential is applied via resistor R–212 to the control circuit of a polarity-sensitive relay means PSR–1. Potentiometer R–204 is excited by a constant potential of opposite sense, and its arm is positioned by the instructor in accordance with the maximum distance at which it is desired that the trainer be provided with a visual picture. A potential proportional to such distance is thereby applied to polarity-sensitive relay means PSR–1 via resistor R–213. When the simulated aircraft is at a distance exceeding that selected by potentiometer R–206, the potential applied to relay PSR–1 via resistor R–212 will exceed that applied through resistor R–213, and contact "a" of relay PSR–1 will remain open. When simulated aircraft distance becomes less then the distance selected by the setting of potentiometer R–204, the polarity of the resultant potential applied to relay PSR–1 will reverse, causing relay PSR–1 to close its contact "a".

The conventional grounded trainer altitude servo M–1100 positions the arm of potentiometer R–207, applying a potential commensurate with instantaneous altitude of simulated flight to polarity sensitive relay means PSR–2 and PSR–3 via resistors R–215 and R–217, respectively. Provided for manual setting by the instructor are potentiometers R–205 and R–206, which may be set to correspond respectively to upper and lower limits of the allowable area within which the student must "fly" the grounded trainer to be provided with a visual presentation. For example, potentiometers R–205 and R–206 may be set in accordance with the upper and lower limits of a conventional instrument landing system radiation pattern, so that the student must fly within the radiation pattern in order to obtain a visual presentation. Potentiometers R–205 and R–206 may be provided with tangent function windings and excited with the trainer-to-airport distance potential from coil $L_3$ to resolver T–1, so that the output potentials appearing on the arms of potentiometers R–205 and R–206 represent the maximum and minimum altitudes at which the simulated aircraft must be situated at any particular distance from the airport if a visual image is to be presented. The maximum allowable altitude potential from potentiometer R–205 is applied via resistor R–214 to relay PSR–2, and the minimum allowable altitude potential from potentiometer R–206 is applied to relay PSR–3. As the altitude of simulated flight exists between the upper and lower limits selected by potentiometers R–205 and R–206, the "a" contacts of both relays PSR–2 and PSR–3 will be closed. If the simulated flight altitude decreases below that selected by potentiometer R–206, the polarity of the resultant potential applied to relay PSR–3 will reverse, opening contact "a" of relay PSR–3. Conversely, if simulated flight altitude increases so as to exceed that selected by potentiometer R–205, the polarity of the resultant potential supplied to relay PSR–2 will reverse, opening contact "a" of relay PSR–2. Thus a complete circuit exists through the contacts of relays PSR–1, PSR–2 and PSR–3 only when the simulated aircraft is maintained within allowable distance and altitude limits set by the instructor's settings of potentiometers R–204, R–205 and R–206.

It will be recalled that the output shaft position of servo M–103 represents the simulated aircraft to airport bearing angle (i.e., angle between "north" and a line between the simulated aircraft and airport). The output shaft position of servo M–103 is applied as one input to differential 210. Applied as another input to differential 210 is a shaft rotation selected by the instructor in accordance with the desired heading of the runway at the simulated airport. The runway heading input shaft is manually positoned by the instructor and retained in position by friction means indicated generally as 211. Thus it will be seen that the position of output shaft 212 of differential 210 will be commensurate with the difference between aircraft-to-station bearing and runway heading. Shaft 212 positions cam 213, which operates switch S–203. Cam 213 is provided with a rise along a portion of its periphery corresponding to twice an arbitrary maximum allowable amount that trainer to station bearing may be allowed to deviate from runway heading. Cam 213 is shown in a position corresponding to direct alignment of the aircraft to station bearing with the runway heading, the cam follower of switch S–203 being centered on the cam rise. If the simulated aircraft approaches the simulated airport at such a bearing that cam 213 no longer closes switch S–203, no visual display will be presented to the student. If a constant potential is applied to terminal 200, it will now be understood from the above explanation that the potential will be applied via contact "a" of relay PSR–1 if the simulated aircraft is within suitable distance of the simulated airport, via contacts "a" of relays PSR–2 and PSR–3 if the simulated aircraft is within suitable altitude limits, via switch S–203 if the simulated aircraft approaches the airport from a suitable direction, via contact "b" of switch S–202 and via normally-closed switch S–204 and intensity rheostat R–229 to projector lamp 214. If the student operates the simulated controls so as to exceed any of the allowable limits, projection lamp 214 will be de-energized, and no picture will be cast upon the screen.

Switch S–201 applies a reference altitude potential to position reference altitude servo M–1000, a conventional grounded trainer position servo (which is equipped with a conventional follow-up potentiometer not shown) and which is used for computing as explained above in connection with FIG. 6. The reference altitude potential may be derived in a number of ways, and two exemplary arrangements are shown in FIG. 9 for deriving such potential. The upper contact of switch S–201 is supplied with a reference altitude potential may be derived in a number of ways, and two exemplary arrangements are shown in FIG. 9 for deriving such potential. The upper contact of switch S–201 is supplied with a reference altitude potential from aplifier U–202 which is derived as will be explained in connection with FIG. 13. A reference altitude potential derived from indicia coded on the film is provided on the lower contact of switch S–201. A conventional photocell pickup X–1 on the projector derives pulses periodically from indicia coded as black and white areas along the "sound" track of the film. These pulses are amplified by amplifier U–206 and applied to operate digital voltage generating means shown as comprising a pair of simple stepping switches K–202 and K–203. Successive pulses applied to the coil of stepping switch K–202 as the simulated aircraft approaches the airport site translates its selector arm counterclockwise as viewed in FIG. 9, applying lesser amounts of voltage through resistor R–220 to amplifier U–204. When the selector arm of switch K–202 arrives at its furthest counterclockwise position, contact "b" of switch K–202 is switched so that the output of amplifier U–206 is then applied to the coil of identical stepping relay K–203. Further pulses from amplifier U–206 then translate the selector of switch K–203 counterclockwise, applying lesser voltages to amplifier U–204 via resistor R–221. The stepping switches utilized may have many more contact positions than shown, so that the reference altitude potential is changed in very fine increments, and many more than two stepping switches may be cascaded. It will be apparent to those skilled in the art that the altitude at which each picture was taken may be coded on the film in analogue fashion rather than digital, if desired, although digital coding is preferred because of its inherent greater accuracy. Analogue coding could consist, for example, of a frequency proportional to altitude, and a conventional frequency discriminator circuit (not shown) connected to the output of amplifier U–206 would produce a potential proportional to reference altitude.

The aircraft-to-airport distance or range potential on coil $L_3$ of resolver T–1 is also applied via scaling resistance R–231 to amplifier U–202. A potential proportional to simulated aircraft altitude is applied via scaling resistor R–230 to summing amplifier U–202. The output of summing amplifier U–202 represents the sum of the applied signals, and as will be fully explained in connection with FIG. 13, is commensurate with a corrected or modified "range" between the aircraft and airport. The corrected range output potential is applied to excite the windings of tangent potentiometer R–222, which is shown schematically for sake of clarity as a simple potentiometer, but which may actually comprise two tangent potentiometers so as to be capable of 360 degree rotation. The arm of potentiometer R–222 is positioned by the output shaft 212 of differential 210 in accordance with angular difference between trainer-to-station bearing and runway heading, so that the potential appearing on the arm of potentiometer R–222 is proportional to the lateral displacement of the simulated aircraft from the airport runway centerline extended. The lateral displacement potential is applied via resistor R–223 to position lateral displacement or "d" servo M–1200, which is provided with a conventional follow-up potentiometer R–224. The output shaft of servo M–1200 positions potentiometers as described above in connection with FIG. 6.

It will be seen that whenever the simulated aircraft comes within the range set by potentiometer R–204, that closure of contact "a" of relay PSR–1 will cause energization of relay K–201, closing contact "a" of relay K–201 and applying the aircraft-to-airport corrected range potential from amplifier U–202 via contact "a" of switch S–202 and resistor R–227 to film drive servo M–205. The film drive servomotor is a conventional position servo, so that film will be fed through the projector at the rate at which the simulated aircraft approaches the simulated airport, and each particular field frame will represent a particular distance from the airport. It may be noted that the film drive will start as soon as the simulated aircraft reaches a minimum distance from the simulated airport regardless of whether the simulated aircraft is then within allowable altitude and direction limits. This serves to insure that the correct film frame will be in the projector immediately no matter when the simulated aircraft comes within the allowable altitude and direction limits.

After a simulated landing has been made and most of the film has been run, the instructor may reload the projector by moving switch S–202 to its lower position. This applies a potential commensurate with the maximum visual pickup distance selected by potentiometer R–204 to the film drive servo M–205 via contact "a" of switch S–202, causing reverse feed of the film until it is again located in its original position, with the frame then in the projector corresponding to the scene photographed at such maximum distance. Contact "b" of switch S–202 de- energizes projection light source 214 while the projector is being run in reverse. Lower contact "c" of switch S–202 applies voltage to the coil of stepping switch K–202 through self-interrupting contact "a" of switch K–202 causing the switch to rotate counterclockwise rapidly until the switch arrives in its last position, at which time closure of contact "c" of switch K–202 shorts self-interrupting contact "a," halting rotation of switch K–202. Return of switch S–202 to its upper position will then de-energize the coil of the stepping switch, allowing it to advance one more position counterclockwise to its original position. Identical switch K–203 and any further stepping switches may be connected similarly. By momentarily opening switch S–204, and by varying the setting of rheostat R–229 the instructor may cause temporary loss of the picture and may simulate varying visibility conditions. It will be apparent that simulation of takeoffs as well as landings may be provided by use of films taken during "reference" takeoffs. In such systems the projected picture may be removed from the screen by de-energizing the projection lamp after the simulated aircraft has moved an arbitrary distance.

If the object utilized to project images of the ground area comprises a motion picture film taken during an actual "reference" flight as mentioned above, it may be desirable to provide a reference altitude potential which decreases non-linearly as the simulated aircraft approaches the airport, since it is practically impossible in many aircraft to maintain a glide path of constant slope down to ground altitude, it being necessary to "level off" shortly before touchdown. Hence it may be necessary to take the pictures along a non-linear glide path. The reference altitude potential may be made to change non-linearly with repsect to aircraft-to-airport distance by means of a variety of readily apparent techniques. For example, a non-linear resistance or other device may be inserted between amplifier U–202 and the upper contact with switch S–201. Using the means shown to derive the reference altitude potential from indicia coded on the film, it will be apparent that code marks may be spaced at increasing intervals on the film "sound" track to provide a more slowly decreasing reference altitude potential along that portion of the film projected during the "leveling off" period of flight. Being derived with respect to displacement from a straight line coincident with the simulated airport runway centerline, the lateral displacement signal derived by the apparatus of FIG. 9 presumes that the pictures on the film were either taken during a flight down a straight centerline or were "distorted" by use on the camera of optical apparatus similar to that of FIG. 7 to have the appearance of being taken along the centerline. While it is usually possible to fly an aircraft along a substantially straight line, and while it is easy to move a camera in a straight line in relation to a model ground scene, indicia may be coded on the "sound" of the film indicating any displacement of the camera from the centerline during the taking of the pictures. A lateral displacement signal commensurate in magnitude and polarity with the deviation of the camera in distance and direction from a straight line may be derived by apparatus similar to that used to derive the altitude reference signal from the film, and such lateral displacement signal may be combined in a summing amplifier (not shown) with the lateral displacement potential from potentiometer R–222 to correct the position of "d" servo M–1200.

It may be noted that a change in $\beta$ of 180 degrees results in no change in the projected image, since each of the variable anamorphosers is symmetrical about the optical axis. However, if the path of simulated flight passes through the reference path, or passes near the reference path between points situated in different quadrants of a circle drawn around the reference path, the value of $\beta$ required to effect the desired distortion may change rapidly from a plus angle to a minus angle, which might require $\beta$ servo M–100 to invert the distorting system very quickly. Since the phenomenon may be noticeable, it is desirable to locate the reference path along a line which the simulated aircraft does not regularly "fly." For example, if the student is expected to make a landing approximately along the guide path of a conventional instrument landing system, it is desirable to locate the reference path away from the guide path beam line, so that the simulated aircraft will not be repeatedly passing through the reference path.

As shown schematically in FIG. 9 servo M–100 serves to rotate both anamorphic distorting means, servo M–300 serves to vary the magnification of the first anamorphic means by rotating sleeve 110 and servo M–400 serves to vary the magnification of the second anamorphic means by rotating sleeve 120, all as shown and explained in connection with FIGS. 6 and 7. As shown schematically in FIG. 9 servo M–200 serves to roll or bank the entire projection apparatus to maintain the horizon level, servo M–500 serves to pitch the entire projection apparatus to provide the required amount of vertical shift, and servo M–600 serves to yaw or turn the entire projection apparatus to provide the required amount of lateral shift, as explained above in connection with FIGS. 1, 6 and 8.

Shown in FIG. 12 are portions of an alternative embodiment of the invention in which cooperatively related electrical distorting means are utilized to provide a proper visual display. The projector PR may be mounted upon the same type of tilting mechanism as that shown in FIG. 11, with the projected image focused upon the lens of conventional television camera 703. The camera or "pickup" is provided in conventional manner with sweep potentials from vertical and horizontal oscillators or sweep generators 700 and 701, which cause the camera tube to scan the image received from projector PR, providing in conventional manner upon conductors 711, 712 a video signal containing picture information. The video signal is applied via amplifiers (not shown) if desired, between the grid and cathode of a conventional projection cathode ray tube CRT. The projection cathode ray tube CRT is provided in conventional manner with filament and anode voltages by means not shown so that a beam modulated in accordance with the picture information is cast upon the face of CRT. It will be seen that if sweep potentials corresponding to those applied to camera 703 were applied to deflection coils L–X and L–Y of CRT, that a picture substantially duplicating that projected by projector PR would appear on the face of CRT. The sweep potentials utilized to drive the camera tube are modified, however, in accordance with the positions of servo M–300 and M–400 to provide a picture on CRT which may be relatively expanded in one dimension and relatively compressed in a perpendicular second dimension. Deflection coils L–X and L–Y encircle the neck of tube CRT in conventional manner, but rather than being mounted fixedly to the tube, the coils may be rigidly attached to a fiber, micarta or other non-magnetic ring gear 708, which encircles the neck of tube CRT and serves to rotate coils L–X and L–Y around the beam axis in the same manner deflection coils are rotated in conventional plan position indicator radar scopes. Each deflection coil is provided with a pair of slip rings (such as ring 705) which are engaged by wipers (such as 706). Deflection coils L–X and L–Y may be affixed to ring gear 708 with their axes of deflection perpendicular to each other.

The size of the picture projected upon CRT depends upon the range (peak to peak amplitude) of the sweep potentials applied to the deflection coils, and hence the amplitudes of such potentials are controlled in accordance with the desired magnification along both of the perpendicular axes of the picture. Amplifiers U–703 and U–704 represent conventional sweep potential power amplifiers utilized to provide the required trapezoidal waveform currents used in electromagnetic deflection systems. With no signal input to amplifiers U–703 and U–704 the current applied to coils L–X and L–Y may be adjusted to maintain the beam of CRT centered on the face. The vertical sweep potential from sweep generator 701 is applied through isolating means U–701 (such as a feedback amplifier or cathode follower) to excite the winding of potentiometer R–701. The arm of potentiometer R–701 is positioned by $M_a$ servo M–300, thereby applying an input potential to amplifier U–703 corresponding to the vertical sweep potential of the camera tube modified by the desired magnification ($M_a$) of the picture in its dimension determined by deflection coil L–Y. Servo M–400 and potentiometer R–702 control the size of the picture along its dimension determined by coil L–X in similar manner.

If the projector tilting mechanism 30 is rolled in in accordance with the angle $\beta$ by servomotor M–100, it will be seen that the video signals derived on conductors 711, 712 are derived with reference to a sweep system having its horizontal and vertical sweeps each acting parallel to one of the axes of magnification $M_a$, $M_b$ of the image. For example, if projector PR is rolled 10 degrees from a vertical position by servo M–100, the video signals derived by camera 703 would produce a picture in which the vertical sweep direction differed by ten degrees. By rotating projector PR relative to camera 703 through the angle $\beta$, the vertical and horizontal sweep directions of the picture derived as a video signal are made to correspond to the perpendicular axes of magnification, $M_a$ and $M_b$. Then by varying the range of the sweep potentials as described above, the size of the resulting picture is controlled. The resulting picture, however, must be continuously rotated through the angle $\delta_b$ in order to maintain things parallel to the horizon level on the face of the cathode ray tube. As indicated schematically in FIG. 12 such angular orientation may be effected by rotating the deflection coils about the scope by means of bevel gear 709. The re-orientation may also be effected by rotating the entire cathode ray tube and using a conventional cathode ray tube in which the deflection coils are not allowed to rotate about the axis of the signal beam. If $\beta$ servo M–100 and $\beta-\delta_b$ servo M–200 are applied as inputs to an ordinary mechanical differential 710, an output shaft position to operate gear 709 through the angle $\delta_b$ is available. It will be apparent to those skilled in the art that in constructing a system in accordance with this embodiment of the invention, that a $\delta_b$ servo may be provided in place of the ($\beta-\delta_b$) servo to drive gear 709 or to rotate the entire cathode ray tube directly by solving for $\delta_b$ in accordance with well known analogue computer technique. By solution of the simultaneous equations given above, the angle $\delta_b$ may be found to be expressible as:

$$\tan 2\delta_b = \frac{2dh^2}{h_1^2 - h_2^2 + d^2} \tag{34}$$

The image on the face of CRT is focused in convenmay be used to operate either distorting means. Although shown) to be viewed by the student. It will be understood that the electrical distorting means shown in FIG. 12 may be substituted for the optical distoring means of FIG. 7 and the same computing and control apparatus may be used to operate either distorting means. Although I have shown electromagnetic deflection means in FIG. 12, and although I prefer to employ such means rather than electrostatic means due to the difficulty in constructing rotatable electrostatic deflection means, those skilled in the art will recognize the possibility of substituting electrostatic deflection means without departing from the invention. In such systems rotation of the image may be accomplished by applying the deflection potentials to a resolver positioned in accordance with the angle $\delta_b$, in a manner similar to that sometimes used for rotating objects on electrostatic plan position indicator radar screens. And although I have shown a distorting system using a uniform sweep on the camera tube and a modified sweep on the projection cathode ray tube, it will become apparent that it is the relative amplitudes of the two sweep systems which cause the required distortion, and hence the camera tube and cathode ray tube sweep deflection means may be interchanged without departing from the invention. Such an arrangement requires, however, that the sweep amplitude modifying potentiometers be driven in accordance with the reciprocals of $M_a$ and $M_b$, and hence in constructing such an embodiment it is preferable to connect servos M–300 and M–400 so as to provide shaft outputs commensurate with the reciprocals of the desired magnifications. The required modifications of the circuit of FIG. 6 to effect such operation will be readily apparent to those skilled in the analogue computer and flight simulator art and need not be set forth herein.

The anamorphic distortion system shown and described in the preceding figures simulates viewpoint displacement within a single plane. Both actual and simulated aircraft rarely, if ever, move within a single plane. If a series of successive objects having the appearance of an area as viewed from succession of points along a reference path is provided, selection of one of said objects in accordance with the point it represents and proper distortion of an image of the selected object in accordance with the displacement between said point and a simulated viewpoint may provide a realistic visual display. If said objects are successively projected with controlled amounts of distortion, a motion picture scene simulating motion along a selected path may be provided. In determining the particular object to use to project a scene during a particular point along the selected path, it is often desirable to consider the displacement of the viewpoint in terms of the reference path slope and the angle at which the objects represent the areas viewed. If a series of successive objects having the appearance of an area as viewed from a succession of points along a reference path are provided, by properly selecting the proper one of such objects in accordance with reference path angle and camera angle as well as distance along said path, and by properly distorting an image of said selected object a more realistic display may be presented. Referring to FIG. 13 there is shown diagrammatically in elevation a reference flight path B—B along which an aircraft may be flown while motion pictures are made of the scenes visible through the windshield of the aircraft, or alternatively, a camera may be moved along such a path relative to a miniature ground scene. Each frame of the motion picture will be seen to represent the area as viewed at a particular point along the reference path, $F_1$, $F_2$, $F_3$ et cetera represent individual film frames taken at successive points along a reference path which slopes at an angle $\alpha_F$ to the horizontal, and each frame may be taken and later projected at an angle $\epsilon$ from the vertical as mentioned above in connection with FIG. 8. The film frame planes are indicated with an exaggerated separation between them for sake of clarity. In ordinary embodiments of the invention, the camera utilized when taking pictures along the reference path may be driven at a rate of 24 frames per second, for example, while the aircraft travels toward the grounded reference point at a speed of 120 feet per second, for example. A frame will be taken then, approximately every five feet.

Assume that the simulated aircraft is located at point P. In order to provide the proper visual display, one need merely project an image of frame $F_1$ with no distortion. If distortion is provided the scenes projected will simulate what is seen from various viewpoints located within the plane of frame $F_1$. Since the simulated aircraft will be at an instantaneous ground range R from the ground reference point C at the airport site, the film drive servo M–205 should position frame $F_1$ in the projector.

But now assume that rather than being located on the reference path, that the simulated aircraft has deviated to, for example, point P' below point P. It will be seen that the desired scene may not be obtained perfectly accurately by projecting a distorted image of frame $F_1$, but that an image of frame $F_4$ should be projected. It will be seen that in systems utilizing a reference path of small slope and a small camera angle (camera and projector axes nearly horizontal), that the displaced viewponit P' will lie on or very near the plane of the film frame corresponding to the instantaneous distance to the airport or touchdown point, but that as the slope of the reference path increases or the camera angle utilized is increased, the number of frames between the frame corresponding to the instantaneous ground range and the frame in the plane of which the displaced viewpoint is located will increase for a given amount of displacement of the simulated aircraft from reference altitude. It will be apparent that the inaccuracy of the projected image will be a function of the number of frames between the frame corresponding to instantaneous ground range and the frame having the simulated viewpoint in its plane, so that in certain embodiments of the invention it becomes desirable to correct such inaccuracy.

In order to project frame $F_4$ when the simulated aircraft is at point P, a ground range R from the airport reference point, the range signal applied to the film drive servo M–205 should be derived in the correct magnitude to position frame $F_4$ into the projector. It will be seen that this may be accomplished by decreasing the range potential applied to servo M–205 by an amount proportional to the distance $x$ of FIG. 13, to give a correct range potential R'.

Hence $R' = R - X$ (34)

From inspection of FIG. 13a, $$h_1 = \frac{\tan \alpha_F}{\cos \epsilon} R' \quad (35)$$

$$h_2 = \frac{h}{\cos \epsilon} \quad (36)$$

$$X = (h_1 - h_2) \sin \epsilon \quad (37)$$

Thus $R' = R - (\sin \epsilon) \left[ \frac{\tan \alpha_F}{\cos \epsilon} R' \frac{h}{\cos \epsilon} \right]$ (38)

$R' = R - \tan \epsilon [R' \tan \alpha_F - h]$ (39)

$R'[1 + \tan \epsilon \tan \alpha_F] = R + h \tan \epsilon$ (40)

$$R' = \frac{R}{1 + \tan \epsilon \tan \alpha_F} + \frac{h \tan \epsilon}{1 + \tan \epsilon \tan \alpha_F} \quad (41)$$

Expression (41) indicates that if the reference path elevation angle $\alpha_F$ and the film plane or camera angle $\epsilon$ are maintained constant, that the corrected potential required to position film drive servo M–205 may be obtained by adding a potential proportional to simulated aircraft altitude to a potential proportional to simulated ground range if suitable scaling is provided. As shown in FIG. 9, the correction potential proportional to simulated altitude is applied from the wiper of altitude responsive potentiometer R–207 to range summing amplifier U–202 via scaling resistor R–230, and adds with the potential applied from coil $L_3$ of resolver T–1 through resistor R–231 to provide a corrected range potential at the output of amplifier U–202. Resistor R–231 is chosen to apply a $$\frac{1}{1 + \tan \epsilon \tan \alpha_F}$$

scaling constant to the ground range potential from resolver T–1, and resistor R–230 is chosen to apply a scaling constant of $$\frac{\tan \epsilon}{1 + \tan \epsilon \tan \alpha_F}$$

to the potential applied from altitude responsive potentiometer R-207. From FIG. 13 reference altitude $h_1$ of frame $F_4$ may be seen to be directly proportional to the corrected range potential R' times, a constant; or:

$$h_1 = \frac{\tan \alpha_F}{\cos \epsilon} \frac{R + h \tan \epsilon}{1 + \tan \epsilon \tan \alpha_F} \quad (42)$$

Thus it may be seen that by providing suitable scaling resistance between amplifier U-202 and the upper contact of switch S-201, a potential commensurate with $h_1$ will appear on the upper contact. If films taken at a variety of camera angles or along glide paths of different slopes are to be utilized with the apparatus of FIG. 9, resistances R-230 and R-231 may be made variable to vary the scale factors. When the selector arm of switch S-201 is in its upper position, the signal applied to reference altitude servo M-1000 is automatically corrected to the frame $F_4$ reference altitude, since the potentiometers R-205 and R-206 utilized for deriving the reference altitude potential are excited by the corrected range potential output from summing amplifier U-202. Hence by governing the projector film drive in accordance with simulated altitude while taking into account the reference path slope and the camera angle, the proper film frame may be projected at the proper instant, and the distortion computing system may be provided with the required input quantities. It will be apparent that since corrected range R' is a function of both actual ground range R and altitude $h$ that when simulated aircraft altitude exceeds reference path altitude, that a converse operation will occur, and a corrected range potential of the magnitude required to make the film drive "lag" properly will be derived, so that the particular film frame located in the projector at any instant will have the simulated aircraft viewpoint located within or nearly within the plane in which the film was taken. If the reference altitude signal is derived from indicia coded on the film rather than from simulated aircraft range (i.e., switch S-201 is moved to its lower contact) no altitude correction of the range potential is necessary for given camera and reference path angles, since the film coding may be spaced so as to insure that the film frame being projected at any instant derives the correct reference altitude potential.

While I have illustrated the invention as utilized in conjunction with grounded aircraft training apparatus, it will be readily apparent to those skilled in the art that it is applicable as well to other training apparatus such as automobile trainers, and as a matter of fact, its use is not limited to training devices. The invention may find use wherever it is necessary or desirable to alter the apparent perspective of an image to make a scene appear as if it is being perceived from a different viewpoint. Certain "special effects" utilized in the production of motion pictures for entertainment purposes may be made by use of the invention, since the ability of the invention to alter the apparent perspective of images allows realistic simulation of scenes as viewed from viewpoints where it may be impossible or impractical to position a camera. Furthermore, while I have illustrated the invention as using motion picture film frames, it will be immediately apparent that the invention is applicable as well to the alteration of the apparent perspective of still pictures, and that as well as images from film transparencies, that images from other transparencies and also reflected images may be utilized with the invention.

The details of the specific type of variable power anamorphosers are not essential features of the invention, and those skilled in the art may find it desirable in some embodiments of the invention to utilize variable power anamorphosers constructed of different combinations of lens elements. It will also be apparent to those skilled in the art that the elements of the two anamorphosers may be interleaved in some embodiments of the invention. It will be apparent to those skilled in the art that the term "variable power anamorphoser" is meant to embrace any lens combination having a variable power in a first direction and a fixed power in a perpendicular second direction, and that the fixed power need not be unity. Those skilled in the art will also recognize that the "plane" of a viewpoint is the plane passing through the viewpoint which is perpendicular to the line of sight from the viewpoint to the scene observed.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for altering the apparent perspective of an image of an object having the appearance of an area as viewed from a reference viewpoint located at a reference altitude $h_1$ to provide an image having the appearance of said area as viewed from a selected viewpoint located at a selected altitude $h_2$ and displaced laterally in the plane of said reference viewpoint a distance $d$ from said reference viewpoint comprising in combination scanning means having a pair of perpendicularly disposed sweep means for scanning said object to provide video signals, a cathode ray tube connected to receive said video signals to produce a beam modulated in accordance with said signals, said cathode ray tube having a pair of perpendicularly disposed beam deflection means, means for providing an axial relative rotation between said object and said scanning means through an angle $\beta$ determinable from the expression:

$$\sin 2\beta = \frac{2d}{h_2\left(M_o - \frac{1}{M_o}\right)}$$

means for providing a variation in the relative sweep amplitudes of said scanning means and said cathode ray tube beam deflection means, one of said beam deflection means being driven with a sweep potential varied in magnitude by a factor of $M_a$ from the sweep potential applied to one of said sweep means and the second of said beam deflection means being driven with a sweep potential varied in magnitude by a factor of $M_b$ from the sweep potential applied to the second of said sweep means, where the ratio $M_o$ between $M_b$ and $M_a$ is determinable from the following expression:

$$M_o^2 - M_o\left[\frac{d^2}{h_1 h_2} + \frac{h_1}{h_2} + \frac{h_2}{h_1}\right] + 1 = 0$$

and means for axially rotating the image produced by said cathode ray tube through an angle $\delta_b$ determinable from the following expression:

$$\tan 2\delta_b = \frac{2dh_2}{h_1^2 + h_2^2 + d^2}$$

2. Apparatus according to claim 1 in which the last recited means comprises means for axially rotating said cathode ray tube beam deflection means about said cathode ray tube beam.

3. Apparatus according to claim 1 in which the last recited means comprises means for axially rotating said cathode ray tube together with said cathode ray tube beam deflection means.

(References on following page)

References Cited by the Examiner

UNITED STATES PATENTS

| | | | |
|---|---|---|---|
| 2,373,313 | 4/1945 | Jeandron | 35—25 |
| 2,420,316 | 5/1947 | Hine | 35—26 |
| 2,510,670 | 6/1950 | Trott | 178—7.5 |
| 2,745,901 | 5/1956 | Owens | 178—6 |

FOREIGN PATENTS 577,566   5/1946   Great Britain.

DAVID G. REDINBAUGH, *Primary Examiner.*

R. L. RICHARDSON, *Assistant Examiner.*